United States Patent [19]
Hagenbuch et al.

[11] Patent Number: 5,795,031
[45] Date of Patent: Aug. 18, 1998

[54] TOP-DUMPING CONTAINER HANDLER

[76] Inventors: LeRoy G. Hagenbuch, 502 W. Northgate Rd., Peroia, Ill. 61614; Jamie L. Adams, 219 Everett, East Peoria, Ill. 61611; James D. McPhail, 810 E. Moneta, Peoria Heights, Ill. 61614

[21] Appl. No.: 589,264

[22] Filed: Jan. 22, 1996

[51] Int. Cl.⁶ .................................................. B60P 1/12
[52] U.S. Cl. ...................... 298/17.6; 298/8 R; 298/18; 298/23 C; 410/77; 414/470
[58] Field of Search .......................... 298/17.5, 17.6, 298/17.8, 18, 8 R, 8 H, 6, 23 C; 280/DIG. 8; 410/72, 73, 76, 77, 80; 414/498, 470

[56] References Cited

U.S. PATENT DOCUMENTS

| | | | |
|---|---|---|---|
| 780,162 | 1/1905 | Doe et al. | 298/8 R |
| 1,024,959 | 4/1912 | Wolf | 298/6 |
| 1,414,516 | 5/1922 | Kirchner | 410/77 |
| 1,573,372 | 2/1926 | Burton | 298/17.8 |
| 3,964,791 | 6/1976 | Griffis | 298/17.6 X |
| 5,080,548 | 1/1992 | Bratlie et al. | 414/385 |
| 5,344,271 | 9/1994 | Bratlie et al. | 414/385 |
| 5,480,214 | 1/1996 | Rogers | 298/17.6 |
| 5,573,367 | 11/1996 | Erickson et al. | 414/498 X |

FOREIGN PATENT DOCUMENTS

| | | | |
|---|---|---|---|
| 406125 | 11/1924 | Germany | 298/17.6 |
| A 17544 | 3/1956 | Germany | 298/17.6 |

OTHER PUBLICATIONS

Letter from SmithCo. dated Jan. 22, 1996 re their side-dump trailers.
SmithCo brochure on side dump trailer.
Circle R brochure on Side Dump Trailer.
Galbreath brochure (1996) on Container Handler & Container Trailer.
Jan. 1994 ad for Holt Container Carrier.
Jul. 1994 *Waste Age* ad for American Roll–Off Container Carrier.
Ad for Brothers Industries Inc. Side dumping recycling unit.
Brochures of Richardton Manufacturing Company dumpers.
Article on Grain Carts by B&B Pork Farm.
Page from "Waste Age" Dec. 1994 on unloading transfer trailers.
Page from "World Wastes"—Article Update Napa Valley, Calif., Implements Waste–By–Rail Program (Aug. 1995).
Ad for Rabanco of California about landfill.
SAE Technical Paper Series—"A New Horizon in Waste Managment—Bulk Intermodal Container Transfer and Dumping (From Railhead to Dump Area)" by Leroy G. Hagenbuch, Aug. 1996.
Copy of two photographs of a Rear Dump Truck.
Jul. 1995, 1 page ad of Columbia Corporation for "Low–Profile Landfill Tipper".
Dec. 1995, cover page of "Machinery Trader"—ad for Side Dump Trailer of South Sioux City, NE.
Nov. 1995, 1 page ad for side dump trailer of Smith Co. Mfg., Le Mars, Iowa.

(List continued on next page.)

*Primary Examiner*—Janice L. Krizek
*Attorney, Agent, or Firm*—Leydig, Voit & Mayer, Ltd.

[57] ABSTRACT

A top-dumping container handling vehicle for receiving, carrying and dumping at least one container having at least one locking slot is provided. The container handler has a frame which has an attached support structure. At least one container cradle for receiving and holding the container is supported by the support structure for movement between a centered position and at least one dump position. The container cradle includes at least one hooking or locking assembly that is movable between a hooked or locked position, wherein the locking assembly does not interfere with the loading of the container into the container cradle, and an unhooked or unlocked position, wherein the locking assembly engages the corresponding locking slot on the container, thereby preventing movement or shifting of the container relative to the container cradle. The container handling vehicle also has a dumping assembly which moves the container cradle between the centered and the dump position.

24 Claims, 21 Drawing Sheets

OTHER PUBLICATIONS

Sep./Oct. 1995 "Solid Waste Technologies" Article on Equipment for Intermodal Waste Shipment.

Jun. 1995 Article from The Mining Record on P&M Establishes All-Time Coal Production Record.

Dec. 1994 Waste Age article—Waste by Rail—By Design.

Mar. 1995 World Wastes article—Is Waste Working on the Railroads?.

Mar. 1994 World Wastes article—Waste by Rail: on the Fast Track?.

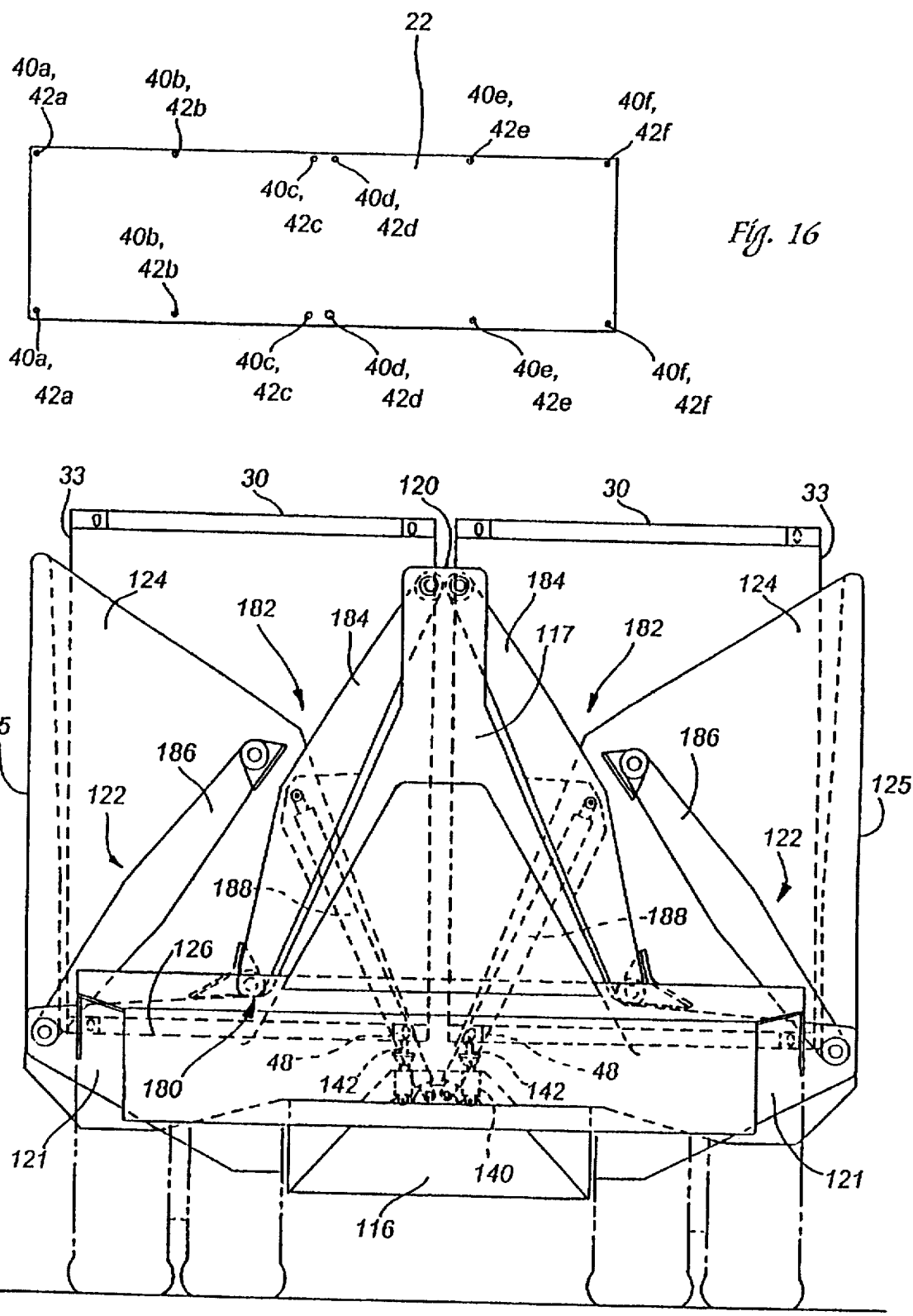

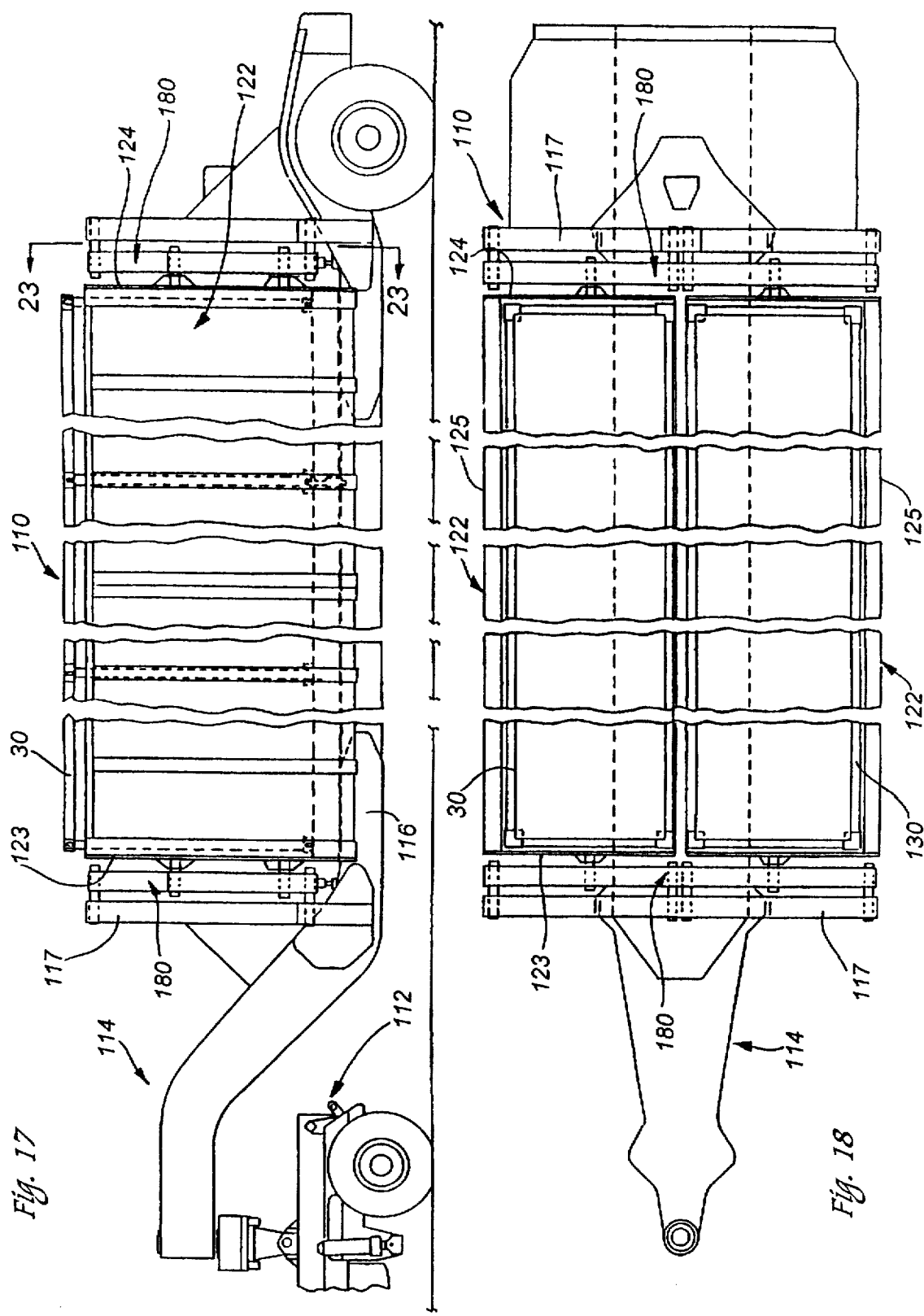

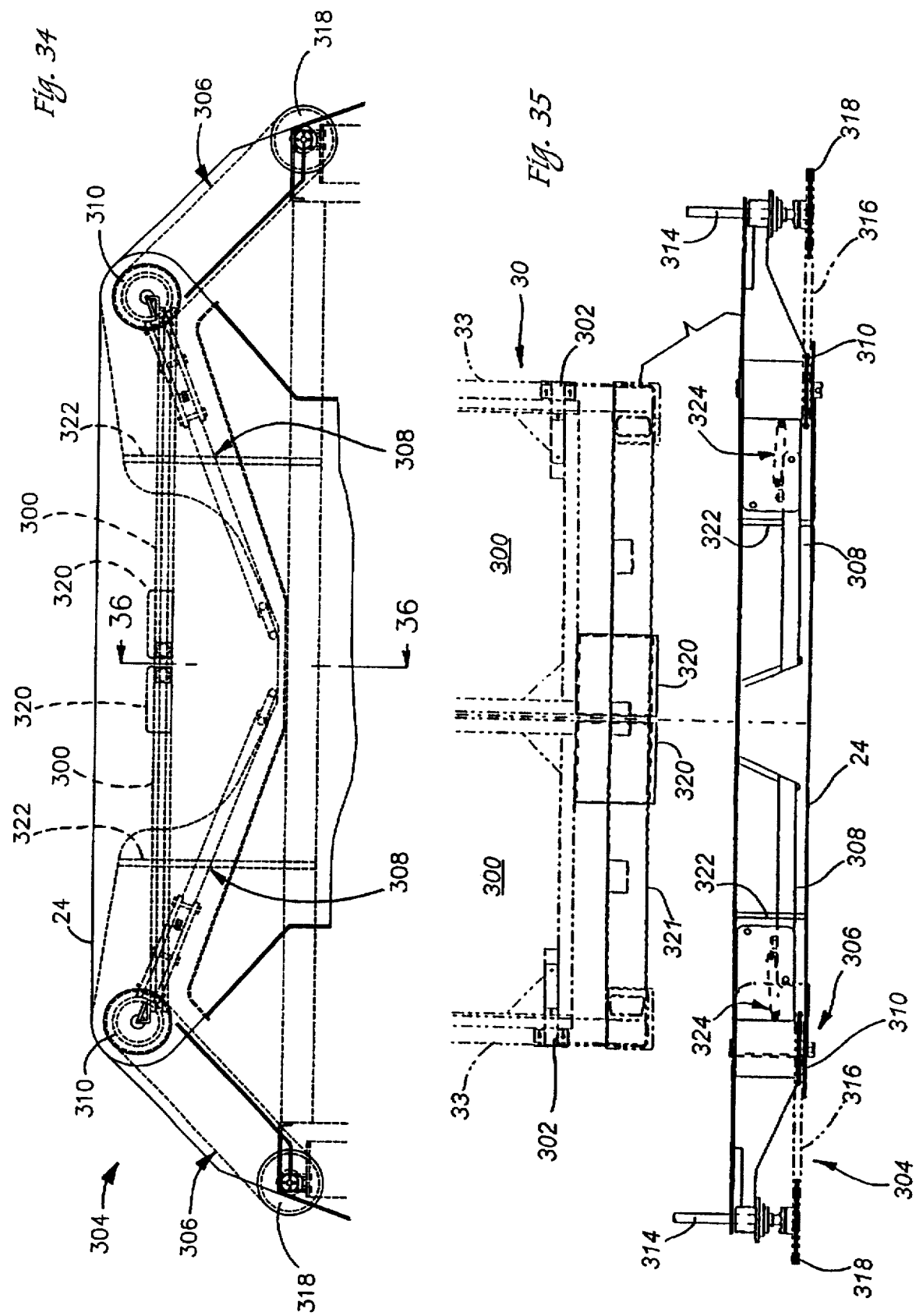

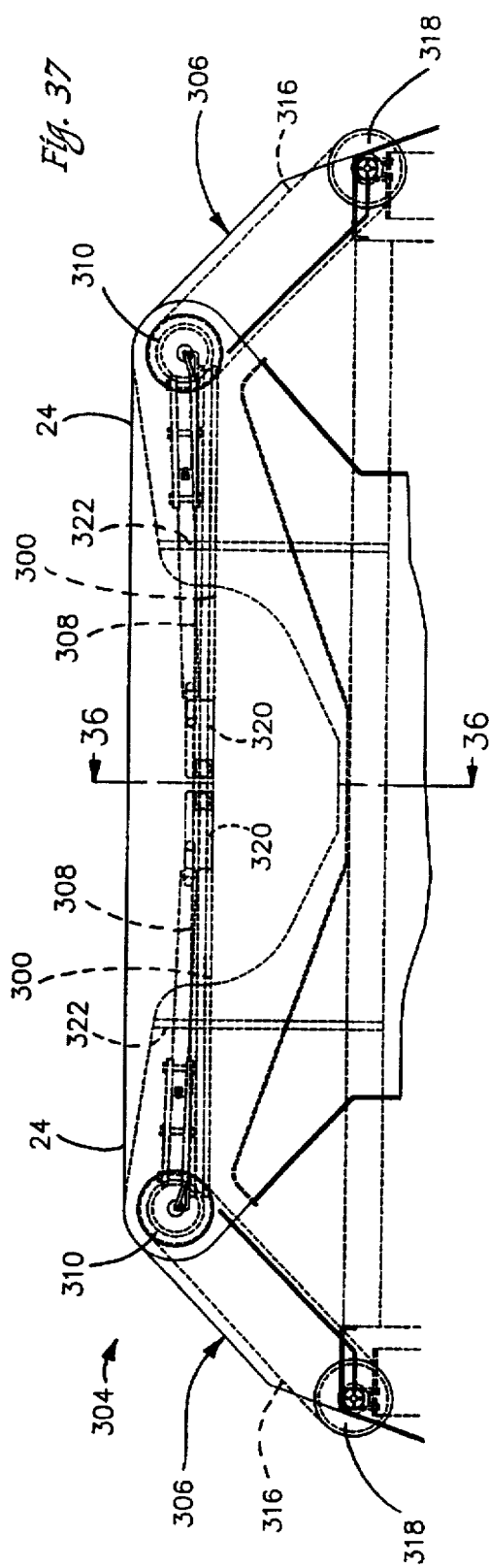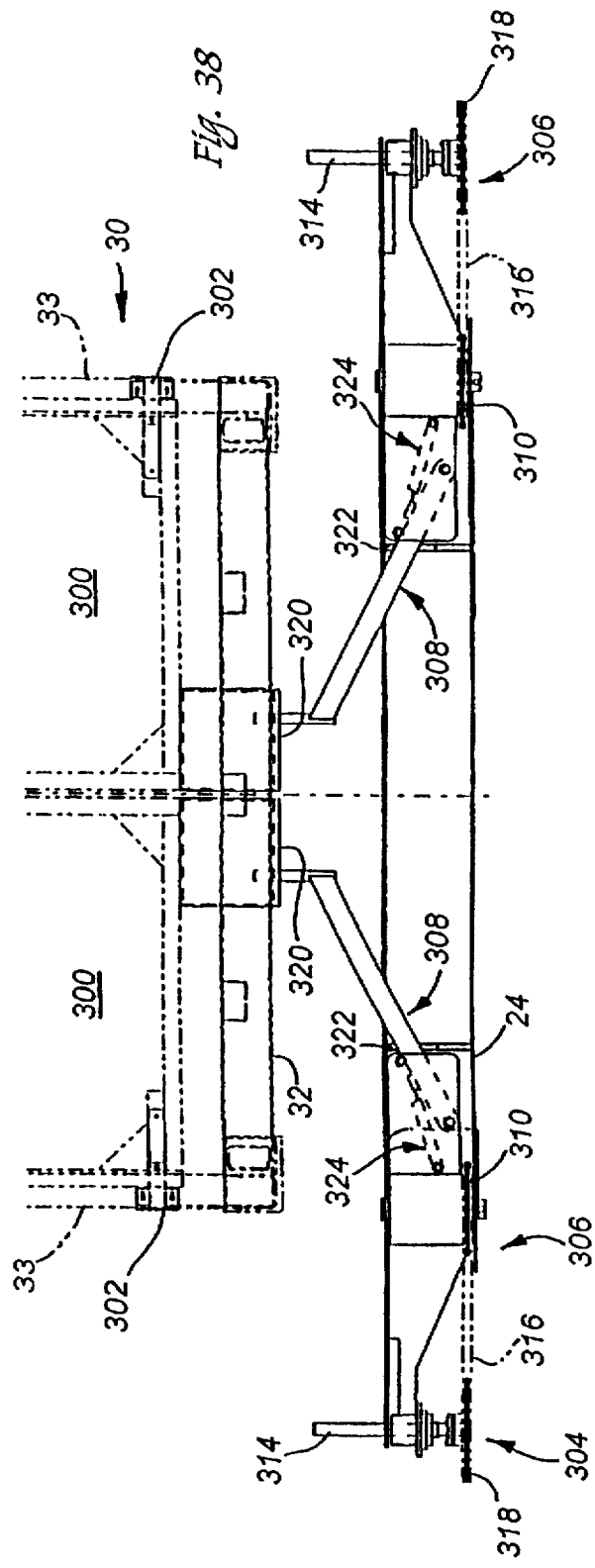

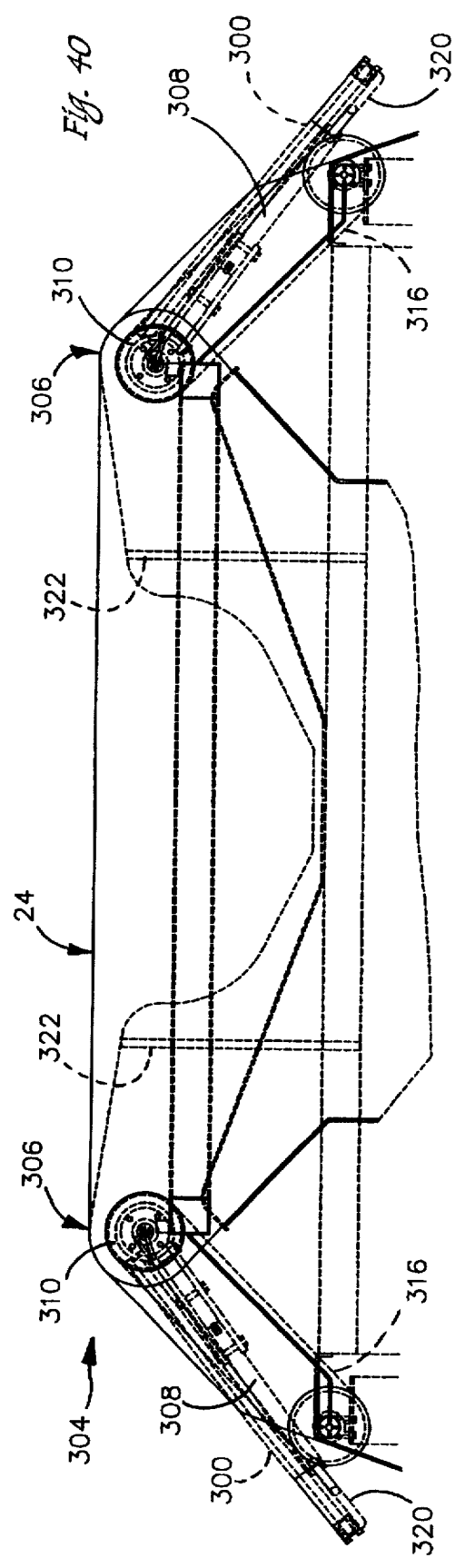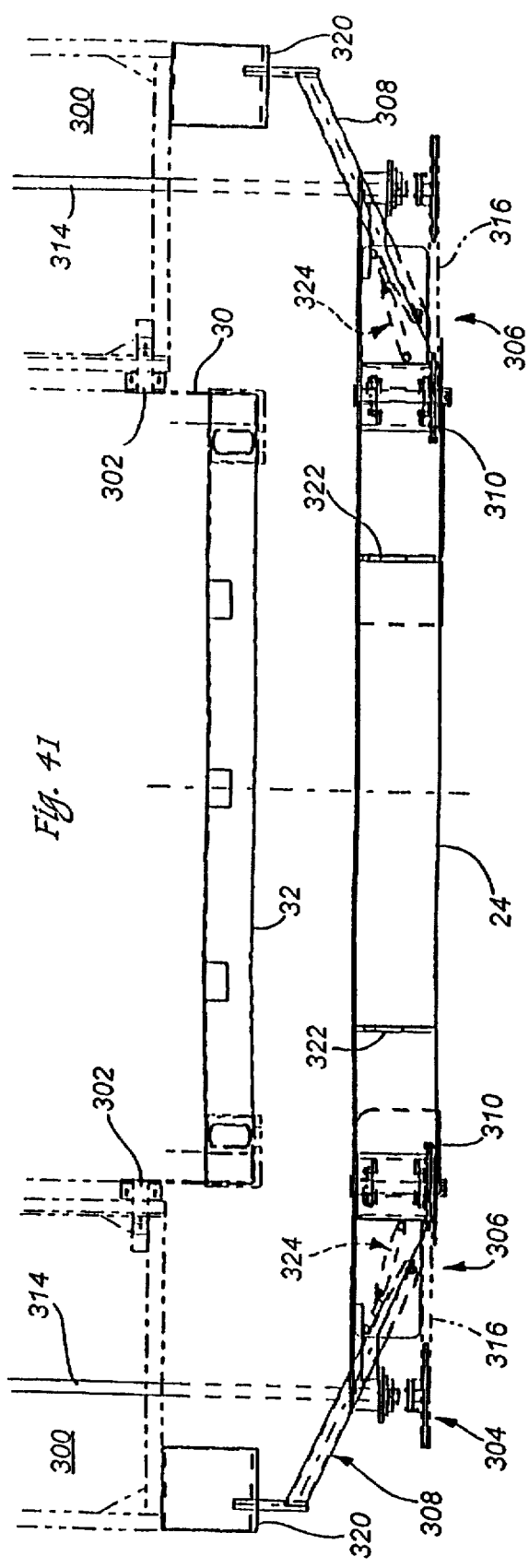

TOP-DUMPING CONTAINER HANDLER

FIELD OF THE INVENTION

The present invention relates generally to a mobile container handler vehicle, and more particularly to a mobile container handler vehicle for handling and top-dumping shipping containers.

BACKGROUND OF THE INVENTION

Often intermodal rail, water, and over the road shipping containers are used to transport materials such as solid waste and the like. Typically, intermodal containers come in standard sizes and have standardized International Standards Organization (ISO) corner casting interconnects that allow these containers to be carried by trucks, boats, and rail cars. When containers reach their destination such as a landfill, they are unloaded from the rail cars, the boats, or the trucks via overhead cranes or the like and either placed on vehicles for transport and unloading within the landfill area or the material in the containers is dumped in a central area for transfer to conventional dump trucks for transport to the actual dump area. While the use of intermodal containers will be discussed primarily in relation to hauling waste material to landfills, intermodal containers are used in a similar fashion for a variety of bulk commodity haulage applications including, for example, hauling coal from mines to power plants.

Conventional hauling vehicles which transport shipping containers within a landfill area typically dump the hauled material from the shipping containers through a rear hinged door on the containers. Typically, shipping container rear dumping is accomplished in one of two ways. First, rear dumping of the shipping containers can be accomplished by providing the container hauling vehicle with a tilting mechanism which tilts the shipping container allowing the hauled material in the container to slide out the rear of the shipping container. Secondly, rear dumping of the shipping containers can be accomplished by backing the container hauling vehicle onto a tilt platform which tilts the entire container hauling vehicle and shipping container allowing the hauled material in the container to slide out the rear of the shipping container. However, rear dumping of the shipping containers is not the quickest or easiest way to unload material from the shipping containers.

The use of rear-hinged doors on shipping containers can pose serious environmental problems in that leachate, i.e. liquids that may be in the hauled refuse, can leak out of an improperly sealed shipping container door. In order to ensure proper sealing, the rear-hinged doors are held closed with ratchet binders. The rear hinged door ratchet binders must be released manually prior to dumping and then manually reattached once the hauled material is dumped. In addition, any damage to the seal that may have occurred while hauling and dumping material, must be repaired before the shipping container can be used again; otherwise, the potential for additional leachate leaking exists. Thus, shipping containers with rear-hinged doors are problematic because it is both time-consuming to operate and maintain the rear-hinged doors.

Often, when hauled material is dumped from the shipping containers via the hinged rear panel, material gets trapped at the rear of the shipping container because of the physical volume of the load in relation to the size of the rear panel opening. In order to dump the load, the load often has to be pushed or dug away from the end of the shipping container. This can significantly increase the time required to dump the load from each shipping container.

In most instances, the quickest and easiest way to unload a shipping container is the same way in which it is often loaded. Intermodal shipping containers that are used to haul waste material are typically top loaded through the top of the shipping container. Thus, the best way to dump an intermodal shipping container carrying waste or the like can be through the top of the container.

In addition, the flexibility of a shipping container dumping system that uses tilt platforms is limited. When tilt platforms are used, the shipping containers can only be dumped in those areas of the landfill that have a tilt platform. This limits the adaptability of the dumping operations to existing wind conditions which may cause refuse to be blown around as it is dumped. Prior to dumping the shipping containers in an area of the landfill that does not contain a tilt platform, a new tilt platform must be provided or an existing tilt platform must be relocated. However, this is costly and time consuming. Alternatively, dump trucks or container hauling vehicles having their own tilt mechanism could be used to haul the shipping containers to those areas of the landfill not serviced by a tilt platform.

Rear dumping becomes more problematic as the length of the shipping container increases. In particular, vehicles with tilt mechanisms can not be used to rear dump longer shipping containers because of the design problems associated with raising the shipping container to a suitable dump height. For example, in order to rear dump a 40 ft. long shipping container, the vehicle must raise the container to a dump height in excess of 25 ft. Thus, rear dumping of longer shipping containers must be done on a tilt platform. However, because of the length of the longer shipping containers, additional equipment must be provided in order to move the refuse away from the rear of the shipping container as it is being dumped so that the balance of the refuse in the shipping container can fall out.

The use of dump trucks to haul the load from shipping containers dumped at a central point eliminates some of the problems associated with dumping the shipping containers in the actual landfill, but it increases the overall amount of equipment necessary to transfer material from the shipping containers to the final load placement area. In order to use dump trucks to haul material from the shipping containers at a central point to the landfill working site, means must be provided to transfer the hauled material from the shipping containers to the dump trucks. This arrangement is disadvantageous because of the extra cost associated with providing, operating and maintaining the equipment used to transfer the hauled material from the container to the dump truck.

OBJECTS AND SUMMARY OF THE INVENTION

Accordingly, it is an object of the present invention to provide a top-dumping container handler which dumps the hauled material from the shipping containers through the top of the shipping containers.

It is another object to provide a top-dumping container handler that can safely haul and dump shipping containers in an off-road rough terrain environment.

It is a another object to provide a top-dumping container handler which can handle shipping containers with different lengths, widths, and heights.

In accordance with these and other objects of the present invention, a top-dumping container handler is provided. The container handler has unique features which permit it to handle and top-dump shipping containers of various sizes.

In a first embodiment, there is provided a container handler having a tractor and a trailer which has a trailer frame. An upwardly extending support arm is pivotally attached to the trailer frame near each of its ends. The arms pivotally support a container cradle so that the container cradle can rotate relative to the trailer about two longitudinal axes. One axis is defined by the pivotal connection of the container cradle to the arms, while the other axis is defined by the pivotal connection of the support arms to the trailer. The container cradle has a front wall, a rear wall, opposing and parallel sides and a floor.

The container cradle is adapted to receive, hold and dump shipping containers of various sizes. The shipping containers are adapted to hold hauled material and have a front wall, a rear wall, opposing and parallel side walls and a floor. In particular, the container cradle is adapted to receive, hold and dump one 40 ft. long shipping container, one 20 ft. long shipping container, or two 20 ft. long shipping containers. The container cradle is also adapted to handle shipping containers that are either 8 ft. wide or 8½ ft. wide and shipping containers that are 5 ft. or greater in height, including standard 5 ft., 6 ft., 8 ft. and 12 ft. high shipping containers.

In order to ensure that the shipping containers are loaded into the proper location within the container cradle, the container cradle is equipped with a plurality of locating pin assemblies and a plurality of width control assemblies. The locating pin assemblies are adapted to ensure that the shipping containers sit in the proper place within the container cradle. The locating pin assemblies include locating pins which engage corner castings welded in the corners of the shipping containers, as the shipping containers are loaded into the container cradle, thereby guiding the shipping containers into the proper position within the container cradle. In addition, in order to accommodate the different load configurations, the locating pin assemblies are adapted to rotate the locating pins between (1) an engaged or extended position in which the locating pins are disposed for engagement with the shipping container corner castings, and (2) a disengaged or retracted position in which the locating pins are disposed so that they do not interfere with shipping container loading. Means are also provided for selectively rotating into the engaged position only those locating pins that are needed for the particular load configuration being used (e.g., one 40 ft. long shipping container, one 20 ft. long shipping container, or two 20 ft. long shipping containers).

The plurality of width control assemblies are adapted to prevent lateral movement of the shipping containers relative to the container cradle as the shipping containers are being loaded into the container cradle. In particular, the width control assemblies include guide members which engage the bottom corner castings of the shipping containers as they are being lowered into the container cradle, thereby guiding the containers onto the appropriate locating pins. Since the container cradle is adapted to handle shipping containers of two different widths, the width control assemblies are adapted to move the guide members between a wide position for use when 8½ ft. wide shipping containers are being loaded and a narrow position for use when 8 ft. wide shipping containers are being loaded. In order to accommodate the various load configurations of shipping containers that could be either 8 ft. wide or 8½ ft. wide, means are provided for selectively moving the guide members of the width control assemblies between a narrow position and a wider position.

In order to secure the shipping containers in the container cradle once they have been properly placed, the container cradle is equipped with a plurality of hooking assemblies. The hooking assemblies include hook members for engaging the corner castings in the lower corners of the shipping containers. The hooking assemblies are adapted for rotating the hook ends of the hook members between a hooked position in which the hook ends engage the corner castings and an unhooked position in which the hook ends are retracted so as to minimize interference with the loading of shipping containers. Means are also provided for selectively rotating into the hooked position only the hook ends of the hooking assemblies which are appropriate for each different shipping container configuration.

Since the relatively thin side walls of the shipping containers would bear the weight of the load in the containers and potentially deform as the shipping containers are rotated for dumping, the container cradle is equipped with a plurality of sidewall support assemblies. The sidewall support assemblies include a linkage which is adapted to move a longitudinally extending sidewall support panel or member between an extended or engaged position where the sidewall support member contacts the shipping container side wall thereby providing support and a retracted or disengaged position where the sidewall support member is disposed so as to not interfere with the loading of the shipping containers. The linkage is actuated by a hydraulic cylinder which has a hydraulic system adapted to cut out the hydraulic supply and lock in the pressure when the sidewall support member contacts a shipping container side wall.

In order to rotate the container cradle for top-dumping the shipping containers, the container handler is equipped with a pair of dumping assemblies which are disposed at each end of the container cradle. The dumping assemblies are adapted to rotate the container cradle between a centered position in which the container cradle is centered over the trailer frame for loading and transporting the shipping containers, a left dump position in which the shipping containers are dumped to the left side of the container handler, and a right dump position in which the shipping containers are dumped to the right side of the container handler. Each dumping assembly comprises a pair of hydraulic cylinders, a gear system, and one of the arms supporting the container cradle. The gear system comprises a trailer gear which is a partial gear that is mounted on the trailer frame and a container cradle gear which is a partial pinion gear that is mounted on the container cradle.

The dumping assembly is adapted so that the left and right dump positions are not equidistant relative to the center of the container handler. In the right dump position, the center of gravity of the container cradle is closer toward the center of the frame of the container handler. Similarly, the left dump position may be used for dumping loads, such as free-flowing material, when it may be desirable to dump the material farther away from the center of the container handler and the container handler tires.

The dumping assembly is adapted so that simultaneous extension of one of the hydraulic cylinders and retraction of the other hydraulic cylinder causes the arm to rotate about its pivotal connection to the trailer. The rotation of the arm causes the container cradle pinion gear to react with the trailer gear thereby rotating the container cradle about its pivotal connection to the arms in the same rotational direction as the rotation of the arm. Of course, the rotation of the arm about its pivotal connection to the trailer rotates the container cradle about that same axis. Thus, the dumping assembly rotates the container cradle about the axis defined by the pivotal connection of the arms to the trailer and the axis defined by the pivotal connection of the container cradle to the arms. Similarly, the opposite actuation of the hydraulic cylinders causes the arm to rotate in the opposite direction thereby rotating the container cradle, via the reaction of the trailer gear with the container cradle pinion gear, in the opposite direction.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 16 is a schematic view of the container cradle showing the various locations of the locating pins.

FIG. 17 is a side elevational view of a second embodiment of the top-dumping container handler in accordance with the present invention.

FIG. 18 is a top view of the second embodiment of the top-dumping container handler.

FIG. 19 is an end view of the second embodiment of the top-dumping container handler showing the trailer frame, the container cradles, the dumping assemblies, and the locking assemblies.

FIG. 34 is a partial rear elevational view of an embodiment of the container having a cover in a closed position and an arm assembly for opening and closing the cover with the arm assembly in the retracted or rest position.

FIG. 35 is a partial plan view of the container and arm assembly in FIG. 34 showing the cover in the closed position and the arm assembly in the retracted or rest position.

FIG. 37 is a partial rear elevational view of the container and arm assembly, similar to FIG. 34, but showing the arm assembly in an intermediate position wherein the arm engages a cover pocket of the closed cover in preparation for opening the cover.

FIG. 38 is a partial plan view of the container and arm assembly shown in FIG. 37.

FIG. 40 is a partial rear elevational view of a container and arm assembly, similar to FIG. 34, but showing the cover in an open position and the arm assembly in an extended or open position.

FIG. 41 is a partial plan view of the container and arm assembly shown in FIG. 37.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
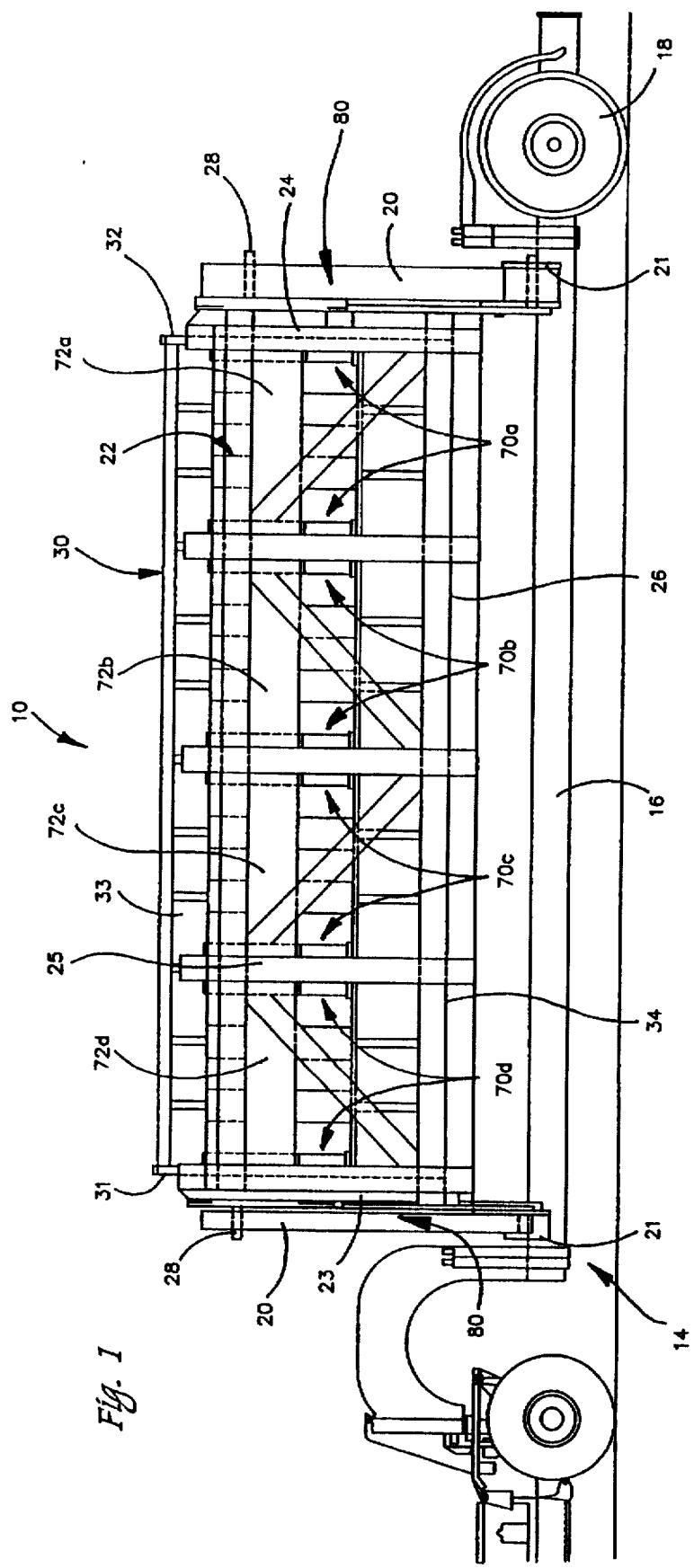
FIG. 1 is a side elevational view of the first embodiment of a top-dumping container handler in accordance with the present invention.

Referring to FIG. 1, there is shown a side elevational view of a first embodiment of a top-dumping container handler 10 in accordance with the present invention. As shown in the illustrated embodiment, the container handler 10 may include a tractor (not shown) and a trailer 14 for transporting conventional shipping containers 30. It will, of course, be appreciated that the container handler 10 may also be mounted to a stationary support, capable of receiving the shipping container 30 from a movable vehicle, such as a rail car or flat bed truck, and dumping the shipping container 30 at a fixed site. For ease of reference, the left and right sides of the top-dump container handler are defined as the left and right sides as one looks from the rear of the trailer towards the front of the trailer. The trailer has a frame 16 which is supported by a plurality of tires 18 that are connected to the frame by a trailer axle (not shown). Two longitudinally spaced upwardly extending arms 20 are pivotally attached to either end of the frame 16 by pivot pins 21.

The two arms 20 are adapted for pivotally supporting a container cradle 22. The container cradle 22 is defined by a front wall 23, a rear wall 24, opposing and parallel sides 25, and a floor 26. As shown in FIG. 1, the sides 25 of the container cradle are not solid, rather, they are comprised of a plurality of vertical support members connected together by a plurality of horizontal and diagonal support members. Likewise, the container cradle floor 26 has an open structure defined by a plurality of spaced floor plates (not shown). The container cradle 22 is pivotally attached to the two arms by two longitudinally spaced pivot pins 28 which are disposed on the front wall 23 and rear wall 24 of the container cradle, as shown in FIG. 1. The pivotal attachments of the container cradle 22 to the arms 20, and the arms 20 to the frame 16, allow the container cradle 22 to rotate relative to the trailer 14 about two longitudinal axes. In particular, the container cradle can rotate about both the longitudinal axis defined by pivot pins 28, and the longitudinal axis defined by pivot pins 21.

Figure 5:
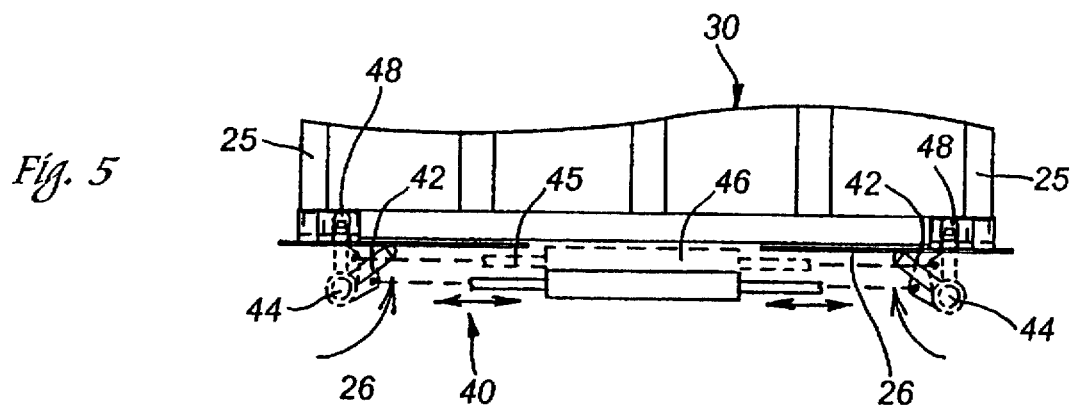
FIG. 5 is an enlarged and partial front elevational view of the locating pin assembly of FIG. 3 showing the disengaged or retracted position of the locating pins in solid lines and the engaged or extended position of the locating pins in broken lines.
Figure 7:
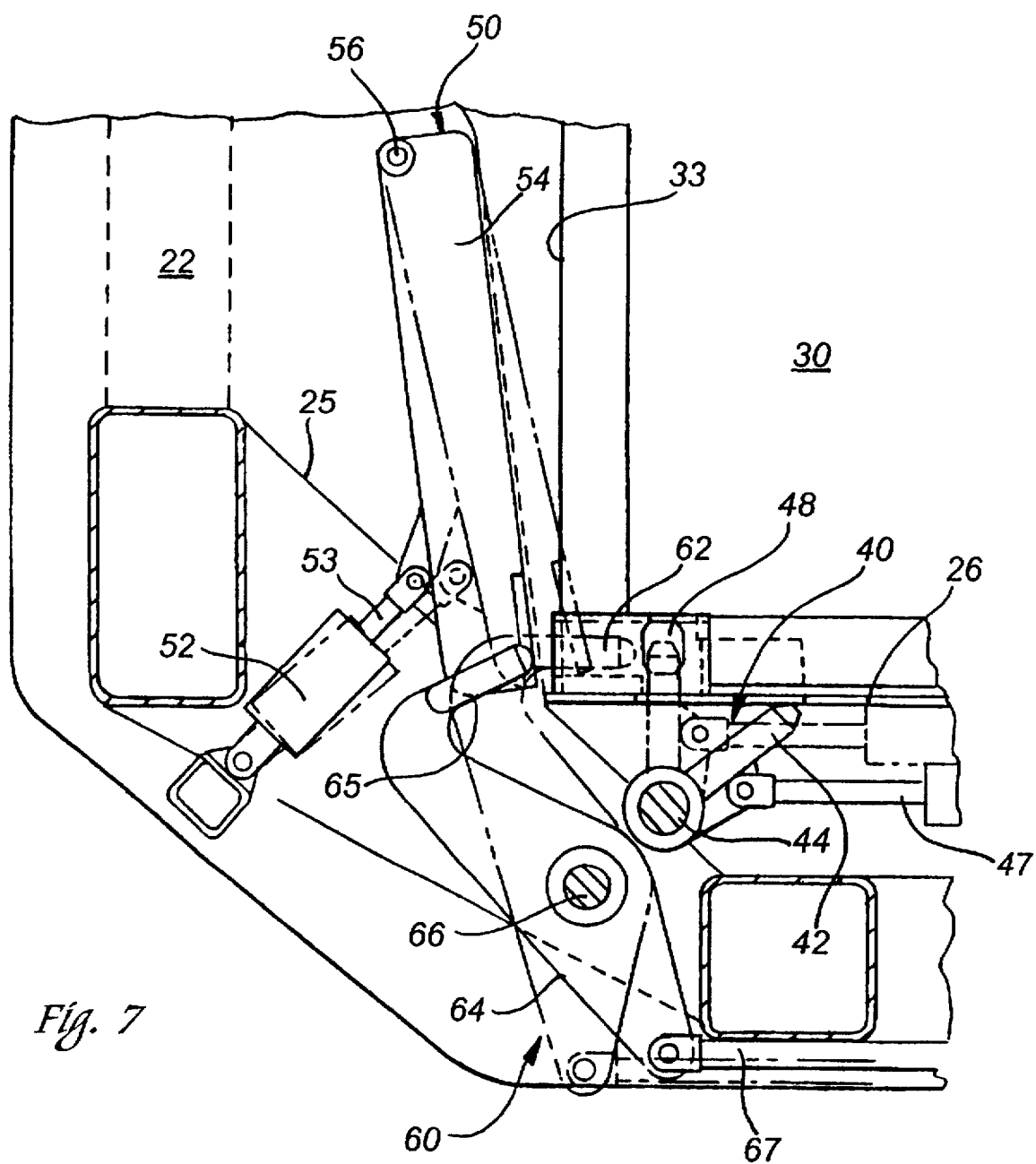
FIG. 7 is an enlarged and partial front elevational view of the hooking assembly, the locating pin assembly, and the width control assembly of FIG. 3 showing one position of the components in solid lines and the other position of the components in broken lines.

In accordance with the invention, the container cradle 22 is adapted to receive, carry and dump shipping containers 30 of various lengths, widths and heights. An overhead crane or the like may be used to load the shipping containers 30 into the container cradle 22 through the open top of the container cradle 22. As best shown in FIG. 1, in conventional fashion, each shipping container 30 has a front wall 31, a rear wall 32, opposing and parallel side walls 33 and a floor 34, which form an open top so that material such as solid waste or other load materials, can be collected in the shipping container 30. In addition, each shipping container 30 is typically covered during transport by either a canvas (not shown), a lid (not shown) hinged on one side 33 of the shipping container 30, or two lids (not shown) with one hinged on each side 33 of the shipping container 30. The shipping containers 30 are typically equipped with standardized corner casting interconnection slots for facilitating easy transport on rail cars, trucks, boats and the like. In the illustrated embodiments, the shipping containers have corner casting interconnection slots that are located in the respective corners of the shipping containers. As best shown in FIGS. 5 and 7, the shipping container has corner casting locating slots 48 in the bottom of the shipping container floor 34 at each of the four corners of the shipping container 30.

In order to ensure that the shipping containers 30 are placed in a correct predetermined position within the container cradle 22 during both transport and dumping, the container cradle 22 includes a plurality of locating pin assemblies 40 (shown in FIGS. 3, 5 and 7) and a plurality of width control assemblies 50 (shown in FIGS. 3, 4 and 7) which act in combination to guide the shipping containers 30 into the proper location as they are loaded into the container cradle 22.

The locating pin assemblies 40 are provided to ensure that the shipping containers 30 are loaded into the proper location within the container cradle 22. As best shown in FIGS. 5 and 7, each locating pin assembly 40 comprises a pair of laterally spaced locating pins 42, a pair of laterally spaced pivot pins 44, and a hydraulic cylinder 46. The locating pins 42 are pivotally attached by pivot pins 44 to the container cradle 22 near the side walls 25 of the container cradle 22 for movement between disengaged and engaged positions. In the retracted or disengaged position (shown in solid lines in FIGS. 5 and 7), the locating pin 42 is disposed underneath the floor 26 of the container cradle 22 so the locating pins not required for any given shipping container 30 do not interfere with the loading of that shipping container. In the extended or engaged position (shown in broken lines in FIGS. 5 and 7), the locating pin 42 extends substantially upward through an opening formed in the floor 26 of the container cradle and into the body of the container cradle 22. The appropriate laterally spaced locating pins 42 are disposed to engage the corresponding corner casting locating slots 48 formed in the shipping container 30 as the container is loaded into the container cradle 22. As shown in the illustrated embodiment, the locating pins (corresponding to locating slots 48A to 48F shown in FIGS. 14 and 15) located in the extreme corners of the container cradle 22 may be permanently fixed in the extended position.

Means for rotating the locating pins 42 between the disengaged position and the engaged position is provided. In the illustrated embodiment, the rotating means comprises a hydraulic cylinder 46 with a piston rod 45 pivotally attached to the locating pins 42. As shown in FIG. 5, the locating pins 42 rotate into engaged position in response to extension of the piston rod 45 by the hydraulic cylinder 46. Similarly, retraction of the piston rod 45 rotates the locating pins 42 into the disengaged position. It will be appreciated that other rotating means will be known to those skilled in the art.

In order to facilitate mating of the locating pins 42 into their corresponding corner casting locating slots 48 on the bottom of the shipping containers 30 as the containers are loaded into the container cradle, the container cradle 22 is equipped with a plurality of width control assemblies 50. In particular, the width control assemblies 50 are adapted to minimize lateral movement of the shipping containers 30 relative to the container cradle 22 as the shipping containers are lowered onto the locating pins 42. Since the container cradle 22 is adapted to handle containers having varying widths, each width control assembly 50 can be positioned between varying widths. In the illustrated embodiment, the width control assemblies 50 may be positioned between two positions, a wide position for use when 8½ ft. wide shipping containers 30 are being loaded and a narrow position for use when 8 ft. wide shipping containers 30 are being loaded. It will, of course, be appreciated that the width control assembly may also accommodate other shipping container dimensions.

Figure 4:
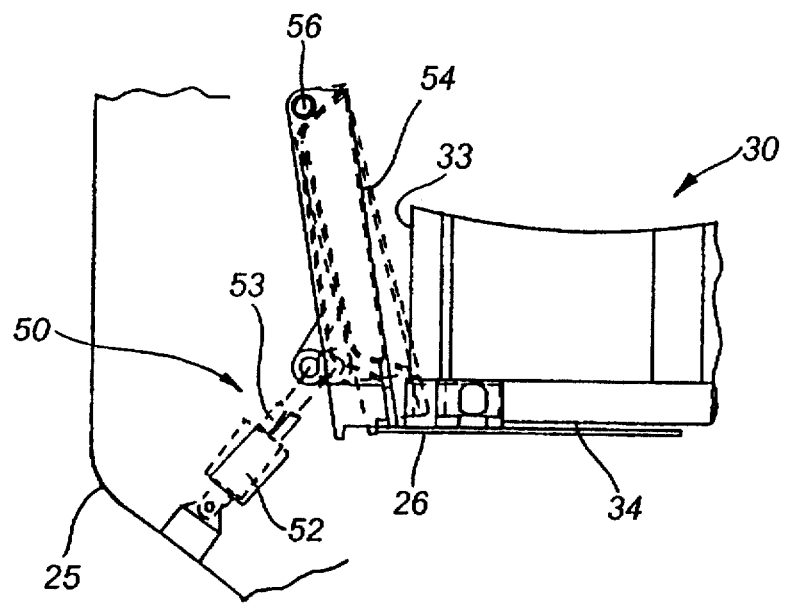
FIG. 4 is an enlarged and partial front elevational view of the width control assembly of FIG. 3 showing the wide position of the width control assembly in solid lines and the narrow position of the width control assembly in broken lines.

The cradle has a width control assembly 50 associated with and disposed near each locating pin 42, as depicted in FIG. 7. As best shown in FIGS. 4 and 7, each width control assembly 50 comprises a hydraulic actuating cylinder 52, a guide member 54, and a pivot pin 56. The guide member 54 of each width control assembly 50 is disposed near the bottom of the side walls 25 of the container cradle 22 near its corresponding locating pin 42 and is disposed so that the guide member 54 angles inward towards the corresponding locating pin 42. Thus, as a shipping container 30 is being lowered into the container cradle 22, the corner castings of the shipping container 30 engage the guide members 54 and slide along a substantially smooth surface, thereby minimizing lateral movement of the shipping container 30 relative to the container cradle 22 as the shipping container 30 is lowered onto the locating pins 42. It will be appreciated that since the container cradle 22 has a width control assembly 50 associated with each locating pin 42, at least four width control assemblies 50 will engage each shipping container 30 as it is loaded into the container cradle 22.

In order to allow for rotation of the guide member 54 between the narrow and wide positions, the top end of each guide member 54 is pivotally attached to the vertical support members of the side walls 25 of the container cradle 22 by a pivot pin 56, as shown in FIGS. 4 and 7. Means for rotating the guide member 54 between the narrow and wide positions is provided. In the illustrated embodiment, the rotating means comprises a hydraulic cylinder 52 and a piston rod 53 pivotally attached to the bottom end of each guide member. The hydraulic cylinder 52 is pivotally attached to the side walls 25 of the container cradle 22 such that extension of the piston rod 53 causes the guide member 54 to rotate about pin 56 towards the narrow position (shown in broken lines in FIGS. 4 and 7). Similarly, retraction of the piston rod 53 causes the guide member 54 to rotate about pivot pin 56 towards the wide position (shown in solid lines in FIGS. 4 and 7). It will be appreciated that other rotating means will be known to those skilled in the art.

Figure 2:
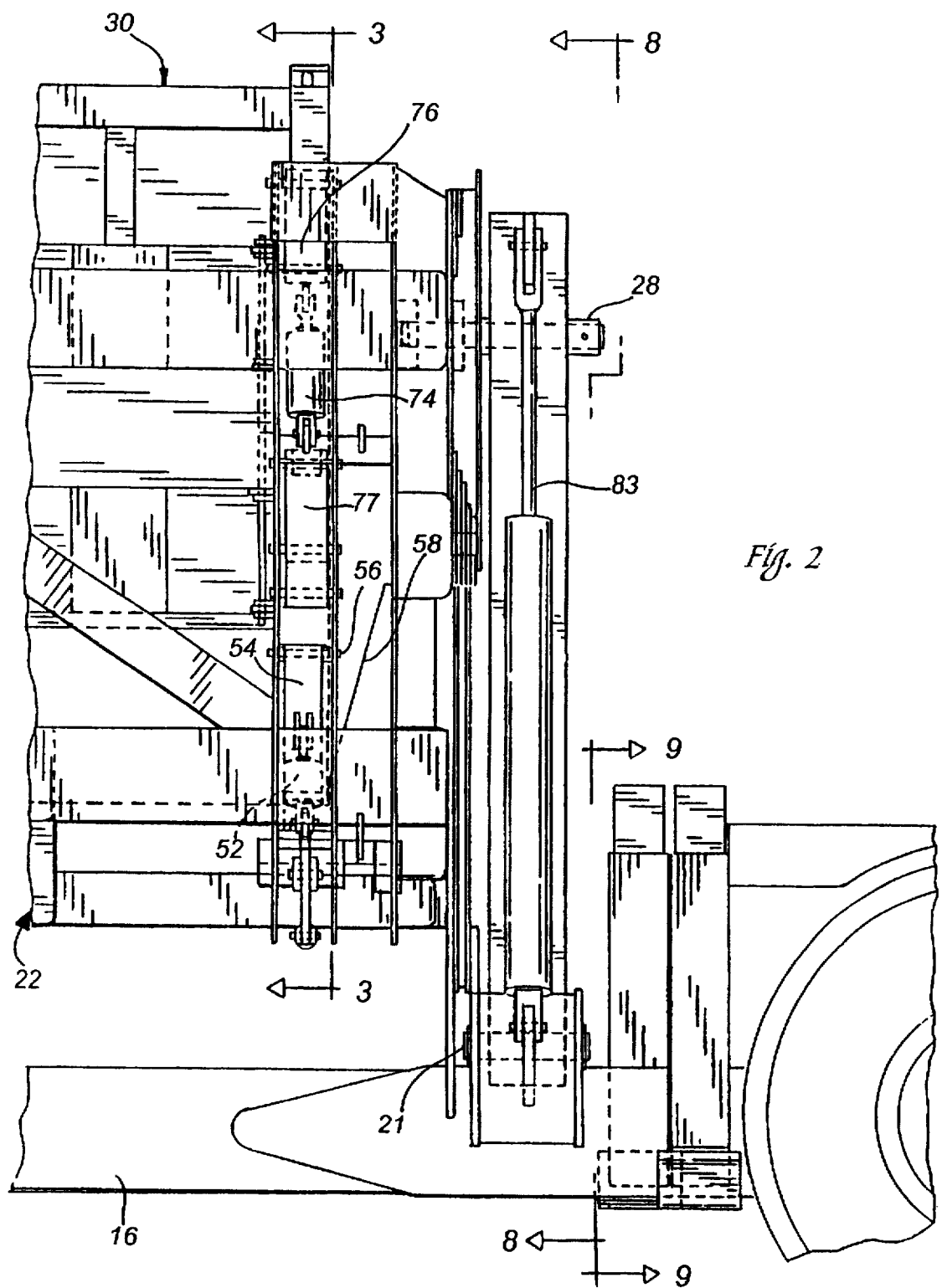
FIG. 2 is an enlarged and partial side elevational view of the first embodiment of the top-dumping container handler showing the dumping assembly, the sidewall support assembly, and the width control assembly.

In addition to the plurality of adjustable guide members 54 disposed on the sides of the container cradle 22, the container cradle may have longitudinally spaced and opposing fixed guide members 58 (only one of which is shown in FIG. 2) mounted near the bottom of the inside of the front and rear walls 23, 24 of the container cradle 22. Similar to the adjustable guide members 54, the fixed guide members 58 are adapted to engage the lower front and rear edges of the container corner castings as the container is lowered into the container cradle 22, thereby minimizing longitudinal movement of the shipping container 30 relative to the container cradle 22. It will of course be appreciated that the fixed guide members 58 may only be used with a shipping container 30 substantially the same length as the container cradle 22 or with multiple containers whose combined length is substantially the same length as the container cradle 22.

Figure 6:
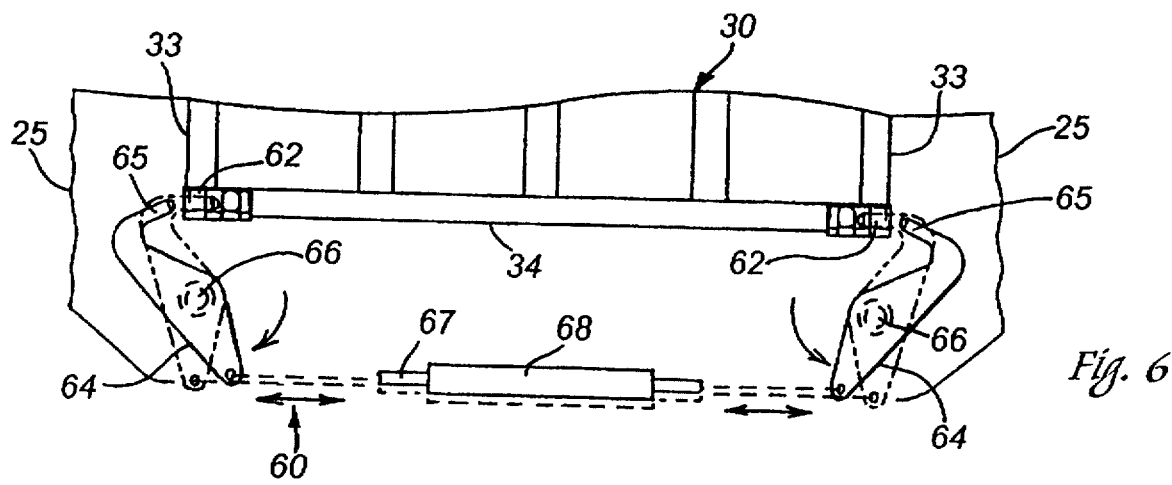
FIG. 6 is an enlarged and partial front elevational view of the hooking assembly of FIG. 3 showing the unhooked position of the hooking assembly in solid lines and the hooked position of the hooking assembly in broken lines.

Once the shipping container 30 is properly positioned within the container cradle 22 on the appropriate locating pins 42, hooking assemblies 60 (shown in FIGS. 3, 6 and 7) are provided for hooking the shipping containers 30 and preventing movement or shifting of the shipping containers 30 relative to the container cradle 22 during transportation and dumping. As best shown in FIGS. 6 and 7, each hooking assembly 60 comprises a pair of laterally spaced hook members 64, a pair of laterally spaced pivot pins 66, and a hydraulic actuating cylinder 68. The hook members 64 are pivotally attached by pivot pins 66 to the container cradle 22 near the container cradle side walls 25 for movement between hooked and unhooked positions. Each hook member 64 has a hook end 65 which can rotate between the hooked (shown in broken lines in FIGS. 6 and 7) and unhooked positions (shown in solid lines in FIGS. 6 and 7). In the unhooked position, the hook ends 65 are located outside of the body of the container cradle 22 so as not to interfere with the loading of the shipping containers. In the hooked position, the hook ends 65 engage corner casting hooking slots 62 that are in the side walls 33 of the shipping container 30 near each of the four lower corners of the shipping container 30. Thus, the container cradle 22 is equipped with a hooking assembly 60 at each longitudinal position along the container cradle 22 where the corresponding corner casting hooking slots 62 of a shipping container 30 is positioned. It will be appreciated that since the hooking slots 62 and the locating slots 48 are disposed at substantially the same longitudinal positions on each shipping container 30, each hooking assembly 60 will be disposed on the container cradle 22 at substantially the same longitudinal position as a locating pin assembly 40.

Means for rotating the hooking members 64 between the hooked and unhooked positions is provided. In the illustrated embodiment, the rotating means comprises a hydraulic cylinder 68 having a piston rod 67 pivotally attached to the corresponding hooking members 64. The hooking pin ends 65 rotate into the hooked position in response to extension of the piston rod 67. Similarly, retraction of the piston rod 67 rotates hooking pin ends 65 into the unhooked position. It will be appreciated that other rotating means will be known to those skilled in the art.

Figure 3:
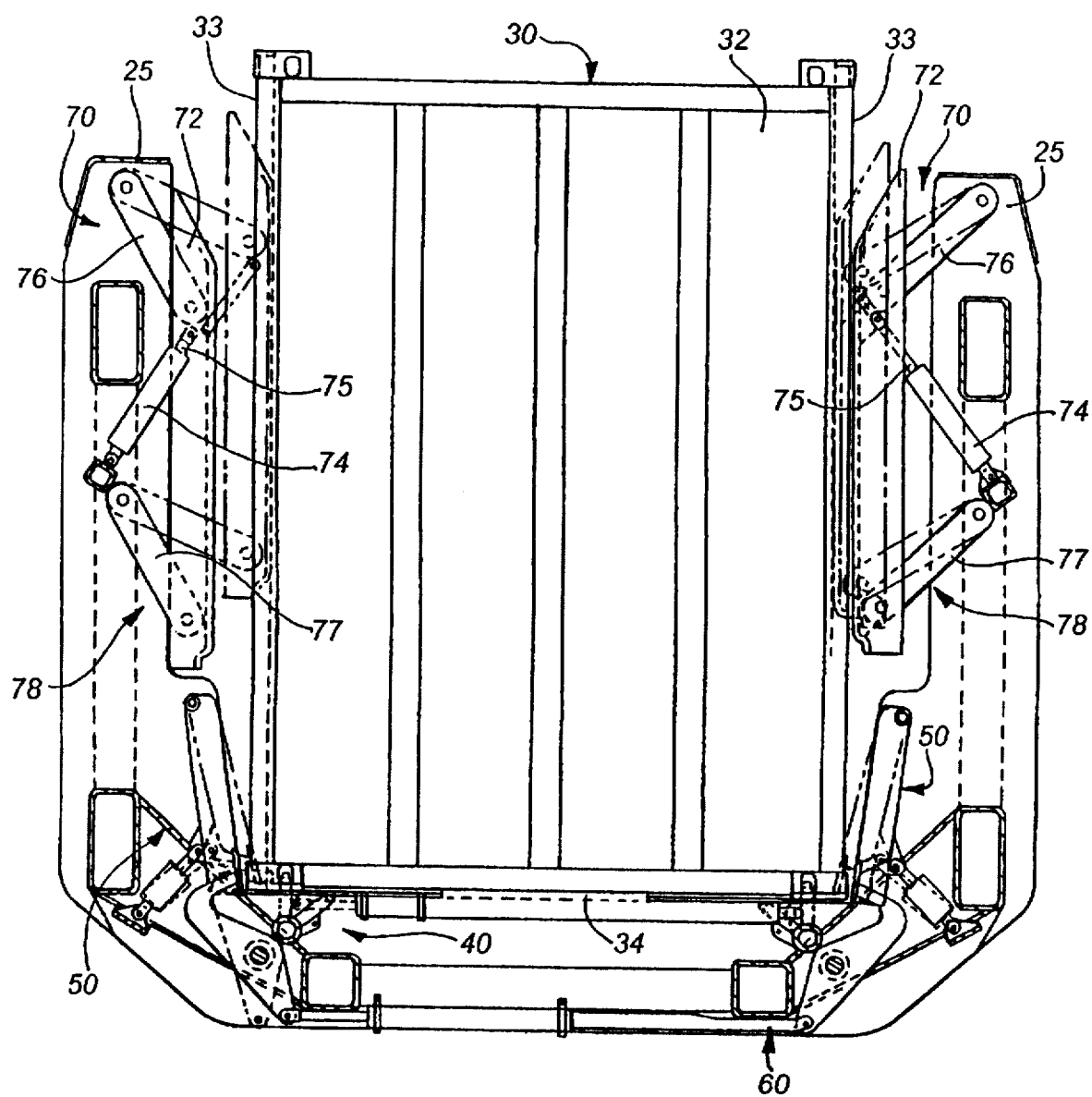
FIG. 3 is a sectional view of the container cradle taken along line 3—3 in FIG. 2 showing the sidewall support assembly, the width control assembly, the locating pin assembly, and the hooking assembly. The two positions of the various components are depicted by having one position shown in solid lines and the other position shown in broken lines.

In order to support the side walls 33 of the shipping container during dumping operations, the container cradle 22 is equipped with a plurality of sidewall support assemblies 70. As best shown in FIG. 3, each sidewall support assembly 70 comprises a longitudinally extending support panel or member 72, a hydraulic cylinder 74, and a pair of parallel links 76, 77 at each end of the support member 72. Each sidewall support assembly 70 is disposed near the top of one of the side walls 25 of the container cradle 22. The end of the support member 72 is attached to a vertical support member of the side wall 25 of the container cradle 22 via the parallel links 76, 77 for movement between retracted and extended positions. In particular, the top end of the support member 72 is pivotally attached to one end of parallel link 76 while the bottom end of the support member 72 is pivotally attached to an end of parallel link 77. The opposite ends of the parallel links 76, 77 are pivotally connected to the side wall 25 of the container cradle 22 so that the combination of the two parallel links 76, 77, the end of the support member 72, and the side wall 25 of the container cradle 22 forms a parallel linkage 78. The parallel linkage 78 is adapted to move the support member 72 between the retracted or disengaged position (shown in solid lines in the left side support assembly of FIG. 3) and the extended or engaged position (shown in broken lines in the left side support assembly of FIG. 3). In the disengaged position, the support member 72 is disposed near a side wall of the container cradle 22 so that it does not interfere with loading or unloading of the shipping containers 30. In the engaged position, the support member 72 bears against the outside surface of one of the side walls 33 of the shipping container 30 thereby providing support.

Means for moving the support member 72 between the engaged and disengaged positions is provided. In the illustrated embodiment, the moving means comprises a pair of hydraulic cylinders 74 pivotally connected to the side wall 25 of the container cradle 22 and a pair of piston rods 75 pivotally connected to each end of the support member 72 (only one hydraulic cylinder and one piston rod are shown in the end view of FIG. 3). When the piston rods 75 are extended by the hydraulic cylinder 74, the support member 72 is moved via the parallel linkage 78 into the engaged position for supporting the side wall 33 of the shipping container 30. Similarly, retraction of the piston rods 75 causes the support member 72 to move via the parallel linkage 78 into the disengaged position. It will be appreciated that other engagement means will be known to those skilled in the art.

In the illustrated embodiment four sidewall support assemblies 70a, 70b, 70c, and 70d are disposed on each side wall 25 of the container cradle 22 as shown in FIG. 1 (only the left side is shown). The four sidewall support assemblies 70a, 70b, 70c, and 70d each have an associated support member 72a, 72b, 72c, and 72d. It will be appreciated that the support members 72a–d provide a surface for the hauled material to flow over the container cradle 22 and away from the container handler 10 when dumping shipping containers 30 which are shorter than the container cradle 22.

In order to accommodate shipping containers 30 having varying widths, the hydraulic system supplying the hydraulic cylinders 74 of the sidewall support assemblies 70 may be adapted to stop the extension of the cylinders 74 when the associated guide members 72 contact the side walls 33 of the shipping containers 30. In particular, the hydraulic system may be adapted to sense the pressure build-up in the system caused by the guide members 72 contacting the side walls 33 of the shipping container 30 and to cut-off the hydraulic supply when the pressure reaches a predetermined level. Once the hydraulic supply is shut-off, the hydraulic system can be set to block the hydraulic flow from the hydraulic cylinder 74 in order to provide support for the side walls 33 of the shipping container 30.

Figure 10:
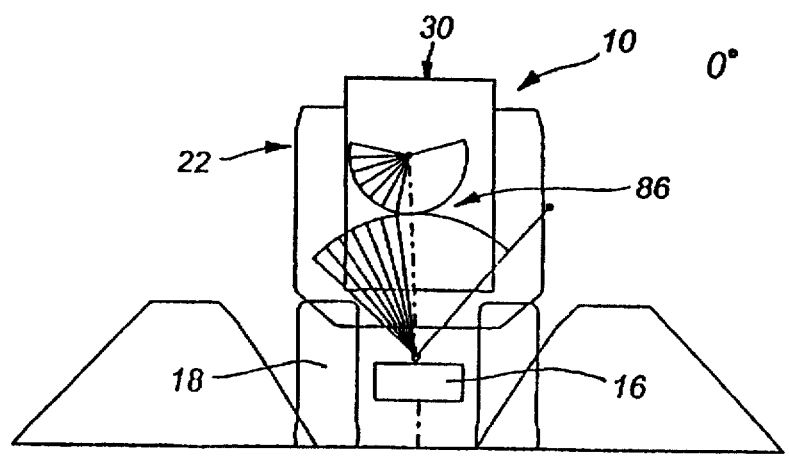
FIG. 10 is a schematic end view of the first embodiment of the top-dumping container handler showing the container cradle and the dumping assembly in the centered position for transporting shipping containers.

In accordance with one of the objects of the present invention, there is provided a dumping assembly 80. The dumping assembly 80 (shown in FIG. 8) is adapted to simultaneously rotate the container cradle 22 about the axis formed by the pivot pins 28 and rotate the container cradle support arms 20 about pivot pins 21 in order to allow the shipping container 30 to be dumped via its open top. The dumping assembly 80 is adapted to rotate the container cradle 22 between three positions: a centered position where the container cradle 22 is substantially centered over the frame 14 for loading and transporting the shipping containers 30 (shown in FIG. 10), a left dump position where the shipping containers 30 are dumped to the left side of the container handler 10 (shown in FIG. 12), and a right dump position where the shipping containers 30 are dumped to the right of the container handler 10 (shown in FIG. 11). In the illustrated embodiment, a dumping assembly 80 is disposed at each end of the container cradle 22. The two dumping assemblies 80 act together to rotate the container cradle 22.

Figure 8:
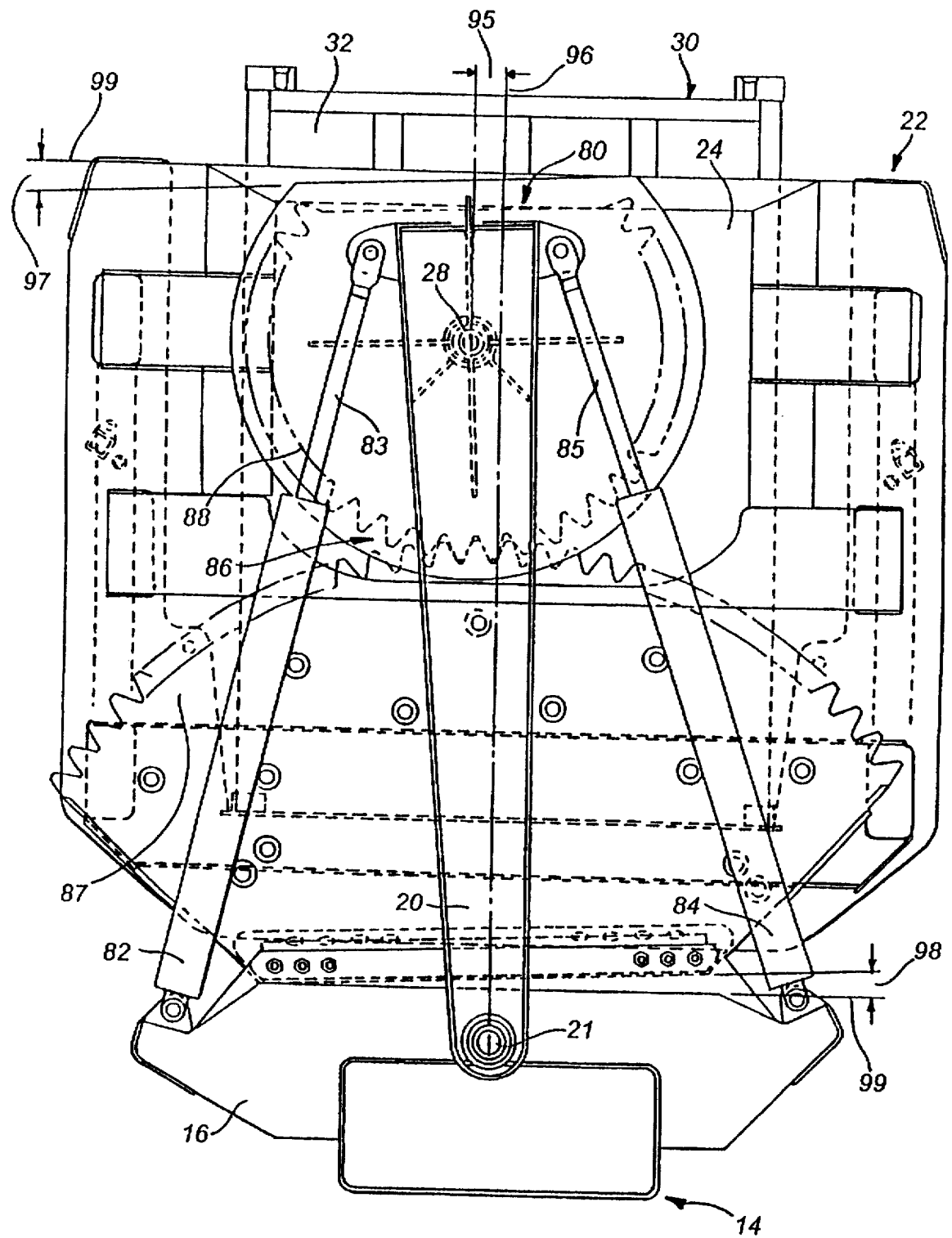
FIG. 8 is a sectional view taken along line 8—8 in FIG. 2 showing the dumping assembly in the centered position for transporting shipping containers.

As best shown in FIG. 8, each dumping assembly 80 comprises a pair of hydraulic cylinders 82, 84, an arm 20 supporting the container cradle, and a gear system 86 that includes a trailer gear 87 and a container cradle pinion gear 88. The trailer gear 87 is a partial spur gear which is fixed to the trailer and is arranged vertically with its teeth disposed upwardly towards the container cradle pinion gear 88. The container cradle gear 88 is a partial pinion gear which is fixed to the container cradle 22 and adapted to engage the trailer gear 87.

Figure 11:
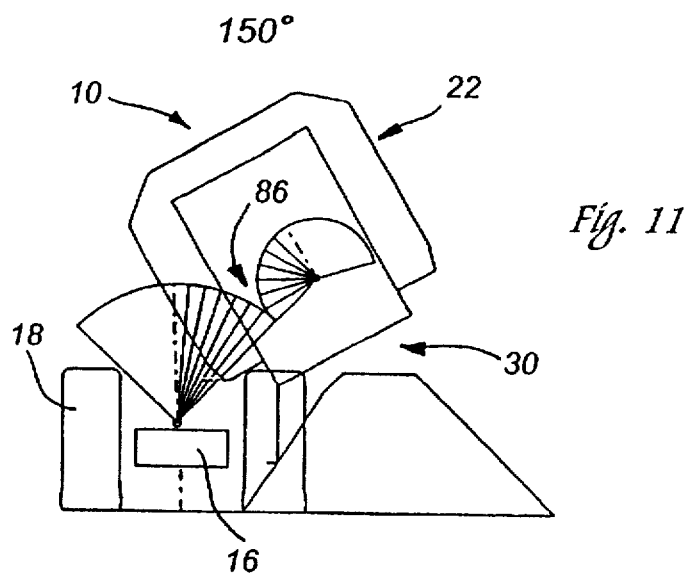
FIG. 11 is a schematic end view of the first embodiment of the top-dumping container handler showing the container cradle and the dumping assembly in the right dump position for dumping the hauled material within the shipping container through the open top of the shipping container.

Means for rotating the container cradle 22 between the right dump, the left dump, and the centered positions is provided. Preferably, the rotating means comprises a pair of hydraulic cylinders 82, 84. As shown in FIG. 8, the piston rod end 83, 85 of each hydraulic cylinder 82, 84 is pivotally attached near the top of the support arm 20 and the cylinder end of each hydraulic cylinder 82, 84 is pivotally attached to the frame 16 of the trailer 14. As shown in FIG. 11, when the left hydraulic cylinder 82 extends its piston rod 83 and the right hydraulic cylinder 84 simultaneously retracts its piston rod 85, it causes the support arm 20 to rotate clockwise about pivot pin 21. The clockwise rotation of the support arm 20 causes the pivot pin 28 to rotate clockwise around the circumference of the trailer gear 87. The clockwise rotation of the pivot pin 28 around the trailer gear 87 causes the teeth on the gears to engage, thereby causing the container cradle pinion gear 88 to rotate the container cradle 22 clockwise about the axis formed by pivot pins 28. The clockwise rotation of the support arm 20 and the container cradle 22 about pivot pins 21 and the container cradle 22 about pivot pins 28 causes the container cradle 22 to be moved into the right dump position. It will be appreciated that other rotating means will be known to those skilled in the art.

Figure 12:
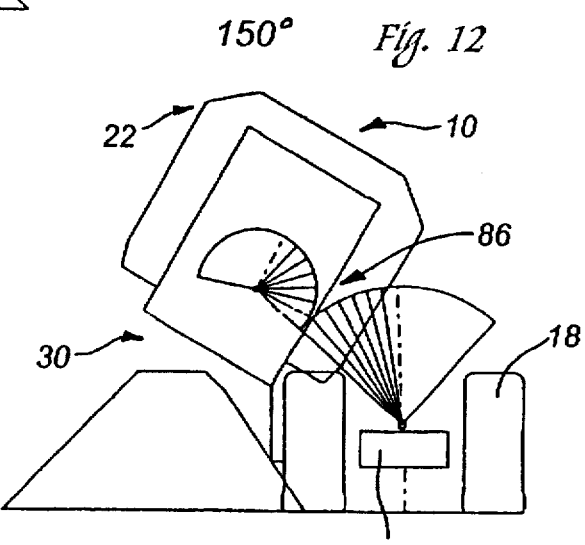
FIG. 12 is a schematic end view of the first embodiment of the top-dumping container handler showing the container cradle and the dumping assembly in the left dump position for dumping the hauled material within the shipping container through the open top of the shipping container.

Similarly, as depicted in FIG. 12, simultaneous retraction of the left cylinder 82 and extension of the right cylinder 84 causes the pivot pin 28 to rotate counter-clockwise around the circumference of the trailer gear 87. The counter-clockwise rotation of the pivot pin 28 around the trailer gear 87 causes the gears to engage, thereby rotating the container cradle pinion gear 88 and the attached container cradle 22 about the axis formed by pivot pins 28. The counter-clockwise rotation of the support arm 20 and the container cradle 22 about pivot pins 21 and the rotation of the container cradle 22 about pivot pins 28 causes the container cradle 22 to rotate into the left dump position. In the preferred embodiment, the container cradle 22 is capable of rotating approximately 150° to both the right and left as shown in FIGS. 11 and 12 respectively.

The dumping assembly 80 is also adapted so that the left and right dumping positions are not equidistant from the center of the container handler. The container cradle 22 and shipping container 30 are relatively closer to the center of the frame 16 of the container handler 10 in the right dump position (shown in FIG. 11) than in the left dump position (shown in FIG. 12). More particularly, as shown in FIG. 8, the support arm 20 is mounted at a predetermined angle 95 from the vertical 96 and the container cradle pinion gear 88 and the trailer gear 87 are mounted at predetermined angles 97, 98 from the horizontal 99. This allows the right dump position to be used for loads, such as frozen or sticky loads, with which it may be desirable to have the center of gravity of the shipping container 30 towards the center of the frame 16 of the container handler 10 in the dump position.

Similarly, the left dump position may be used with loads, such as free-flowing materials, with which it may be desirable to dump farther away from the center of the container handler 10 and the container handler tires 18.

Figure 13:
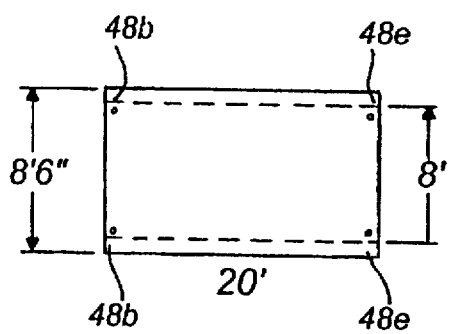
FIG. 13 is a schematic bottom view of one 20 ft. long shipping container load configuration that is either 8 or 8.5 ft. wide showing the locations of the corner casting locating slots.
Figure 14:
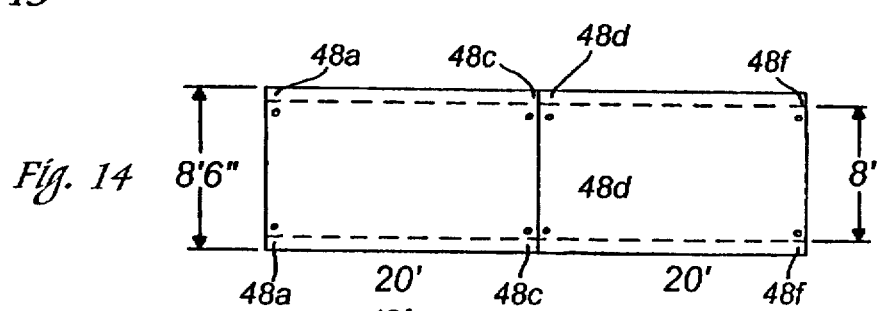
FIG. 14 is a schematic bottom view of two 20 ft. long shipping containers load configuration that is either 8 or 8.5 ft. wide showing the locations of the corner casting locating slots.
Figure 15:
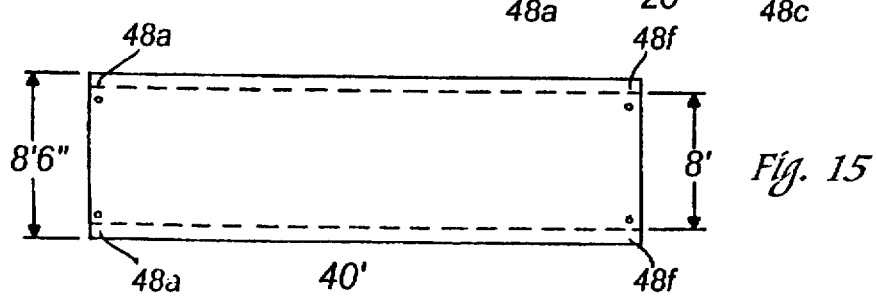
FIG. 15 is a schematic bottom view of one 40 ft. long shipping container load configuration that is either 8 or 8.5 ft. wide showing the locations of the corner casting locating slots.

It will be appreciated that the container cradle may be adapted for holding different configurations of containers. In the illustrated embodiment, the container cradle 22 is adapted to hold three different configurations of shipping containers 30. In particular, the container cradle 22 is adapted to hold either one 40 ft. long container (FIG. 15), two 20 ft. long containers arranged end-to-end in the container cradle (FIG. 14), or one 20 ft. long container arranged in the center of the container cradle (FIG. 13). In addition, as shown in FIGS. 13–15, the container cradle 22 is adapted to hold shipping containers 30 that are either 8 ft. wide or 8½ ft. wide. As previously described, the corner of each container has a respective corner casting with a locating slot positioned in the conventional predetermined position. The container cradle 22, schematically illustrated in FIG. 16, has a plurality of pairs of laterally spaced locating pins generally referenced as 42a, 42b, 42c, 42d, and 42f positioned to engage corresponding locating slots in the shipping container 30. A locating pin assembly generally referenced as 40a, 40b, 40c, 40d, and 40f (shown in FIG. 16) is associated with each of the respective pairs of locating pins 42a, 42b, 42c, 42d and 42f (shown in FIG. 16). Similarly, the container cradle has a hooking assembly 60 and a pair of width control assemblies 50 associated with each pair of locating pins to engage the shipping container 30.

In order to accommodate the single 40 ft. long container configuration, the container cradle 22 is equipped with locating pin assemblies 40a and 40f which are disposed such that their associated pairs of locating pins 42a and 42f engage the corresponding corner casting locating slots 48a and 48f at each end of the 40 ft. long container which are schematically shown in FIG. 15. In the preferred embodiment, the locating pin assemblies 40a and 40f are fixed in the engaged position. Depending on whether the 40 ft. container being loaded is 8 ft. or 8½ ft. wide, the operator actuates the hydraulic cylinders 52 of the width control assemblies 50 associated with the locating pin assemblies 40a and 40f, thereby rotating the guide members 54 into either the narrow or the wide position. The 40 ft. long container is then lowered into the container cradle 22. As the 40 ft. long container is lowered, the guide members 54 of the width control assemblies 50 and the fixed guide members 58 guide the shipping container 30 onto the pairs of locating pins 42a, 42f.

Once the 40 ft. container is set in the container cradle 22 on the appropriate locating pins 42a, 42f, the operator actuates the hydraulic cylinders 68, rotating their corresponding hook ends 65 into engagement with the corner casting hooking slots 62 on the 40 ft. container and hooking the 40 ft. long container in the container cradle 22. Finally, the operator actuates the hydraulic cylinders 74 of the sidewall support assemblies 70 in order to move the support members 72 into engagement with the side walls 33 of the 40 ft. container. The operator may move the support members 72 into engagement with the side walls 33 of the shipping container 30 as soon as the shipping container 30 is placed on the container handler 10 or just prior to dumping the shipping container 30.

In order to accommodate two 20 ft. long containers loaded end-to-end in the container cradle, the container cradle 22 is equipped with locating pin assemblies 40a, 40c, 40d, and 40f having locating pins 42a, 42c, 42d, and 42f for engaging the corresponding corner casting locating slots 48a, 48c, 48d, and 48f for the two 20 ft. long containers schematically depicted in FIG. 14. As with the arrangement for the 40 ft. long container, width control assemblies 50 and hooking assemblies 60 are located at substantially the same longitudinal position on the container cradle 22 as the locating pin assemblies 40a, 40c, 40d, 40f. During the loading of the 20 ft. long containers, the locating pin assemblies 40a, 40c, 40d, and 40f and their associated width control assemblies 50 and hooking assemblies 60 are actuated as described above. Again the sidewall support assemblies 70 are actuated into engagement with the shipping containers 30 either as soon as the shipping containers 30 are loaded onto the container handler 10 or just prior to dumping the shipping containers 30.

In order to accommodate a single 20 ft. long container placed in the center of the container cradle, the container cradle 22 is equipped with locating pin assemblies 40b and 40e whose corresponding pairs of locating pins 42b and 42e engage the pairs of corner casting locating slots 48b and 48e on the 20 ft. long container as schematically illustrated in FIG. 13. Width control assemblies 50 and hooking assemblies 60 are also provided at the same longitudinal positions along the container cradle 22 as the locating pin assemblies 40b and 40e. In the same manner as discussed in connection with the loading of the 40 ft. long container, the operator actuates the hydraulic cylinders 46 corresponding to the locating pin assemblies 40b and 40e. In turn, the hydraulic cylinders 52 and 68 corresponding to the width control assemblies 50 and hooking assemblies 60 associated with the locating pin assemblies 40b, 40e are also actuated. Finally, the operator actuates the hydraulic cylinders 74 of the sidewall support assemblies 70 in order to move the support members 72 into engagement with the side walls of the 20 ft. container. The support members 72a and 72d extend to the full stroke of their associated hydraulic cylinders without contacting anything, while the support members 72b and 72c extend into engagement with the side walls 33 of the 20 ft. container.

Thus it is seen that in order to accommodate the three different load configurations, the illustrated embodiment of the container cradle 22 is equipped with a total of six locating pin assemblies 40 (two of which are fixed in the engaged position as described above), six hooking assemblies 60, and twelve width control assemblies 50. FIG. 16 schematically illustrates the positions of the locating pins which correspond to the six locating pin assemblies 40, the six hooking assemblies 60, and the twelve width control assemblies 50. Each group of assemblies may be controlled by the operator using a separate selector switch. For example, the selector switches for the locating pin assemblies 40 and the hooking assemblies 60 may have three positions which correspond to the three load configurations. Similarly, the selector switch controlling the width control assemblies 50 may have eight positions which correspond to the eight different combinations of 40 ft. long and 20 ft. long containers having a width of either 8 ft. or 8½ ft. that the container cradle 22 is capable of carrying. Thus, in order to set the container cradle 22 for loading and carrying the three different load configurations, the operator merely notes the number, the length, and the width of the shipping containers 30 that will be loaded into the container cradle 22 and places the selector switches in the appropriate positions. In order to ensure that all of the shipping containers 30 are loaded into the container cradle 22 properly, the hydraulic systems for the locating pin assemblies 40, the width control assemblies 50, the hooking assemblies 60, and the sidewall support assemblies 70 may be interlocked such that they can only be used when the dumping assembly 80 is in the centered position.

Figure 9:
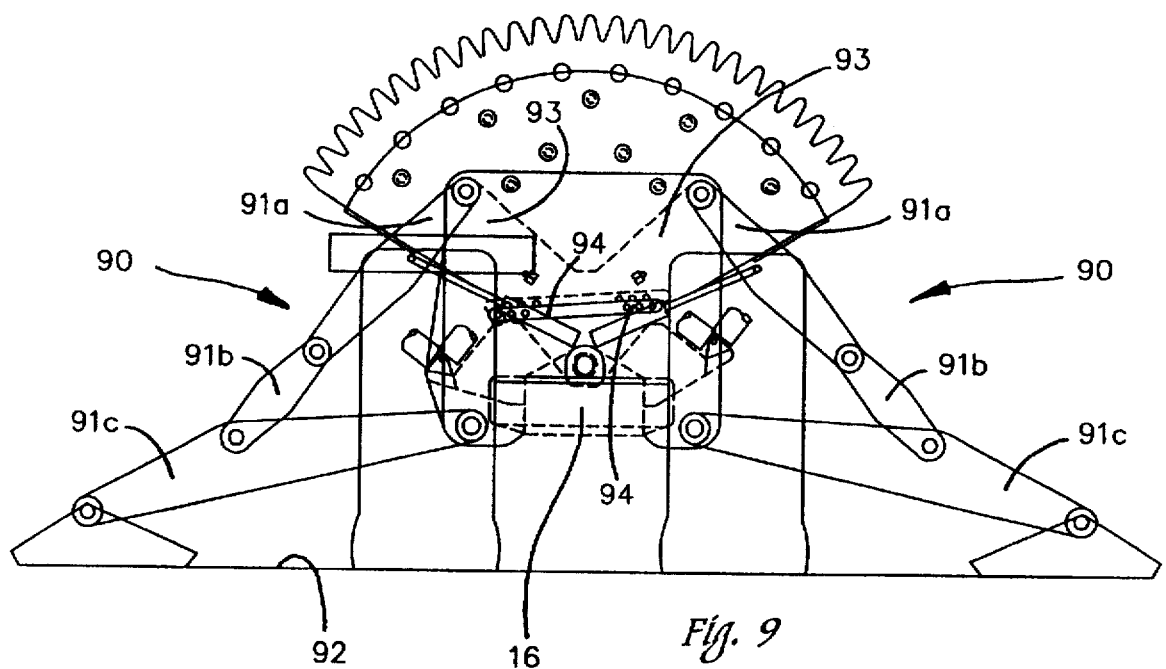
FIG. 9 is a sectional view taken along line 9—9 in FIG. 2 showing the outriggers in the extended position.

As shown in FIG. 9, the first embodiment of the top-dump container handler 10 may also be equipped with outriggers 90 in order to stabilize the container handler 10 during dumping operations. The outriggers 90 are capable of moving between (1) an engaged position where the outriggers 90 contact the ground 92 thereby providing stability for the container handler 10 and (2) a disengaged position (not shown) where the outriggers 90 are disposed close to the trailer frame 16 so as not to interfere with movement of the container handler 10. In the illustrated embodiment, each outrigger 90 comprises a four bar mechanical linkage which includes three link members 91a, 91b, and 91c and a support structure 93 mounted on the trailer frame 16. A hydraulic cylinder 94 that is attached to the support structure 93 and link member 91a moves the outriggers 90 between the engaged and disengaged positions.

Referring to FIGS. 17–26, there is shown a second embodiment of the top-dump container handler 110 which includes a tractor 112 (not shown) and a trailer 114 having a frame 116. As shown in FIGS. 17–19, a support structure 117 comprising an upwardly extending arm 120 and two opposing outwardly extending members 121 is attached to either end of the frame 116. The support structure 117 is adapted to support a pair of container cradles 122 arranged side-by-side. As best shown in FIG. 19, the container cradles 122 have a substantially L-shaped body defined by a front wall 123, a rear wall 124, a side wall 125, and a floor 126. As in the first embodiment, the container cradles 122 are adapted to receive, carry, and dump shipping containers 30 including those having conventional standardized corner casting interconnection slots.

Figure 20:
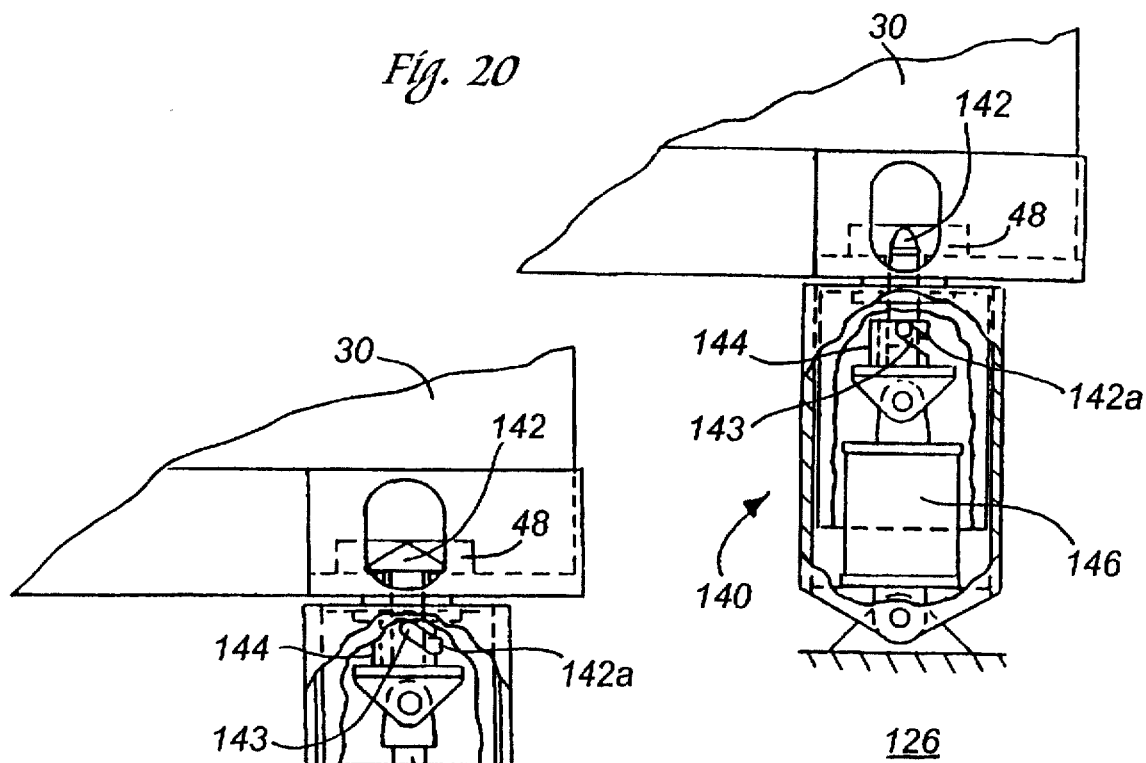
FIG. 20 is an enlarged partially cut-away end view of the locking assembly of FIG. 19 showing the locking assembly in the retracted or unlocked position.
Figure 21:
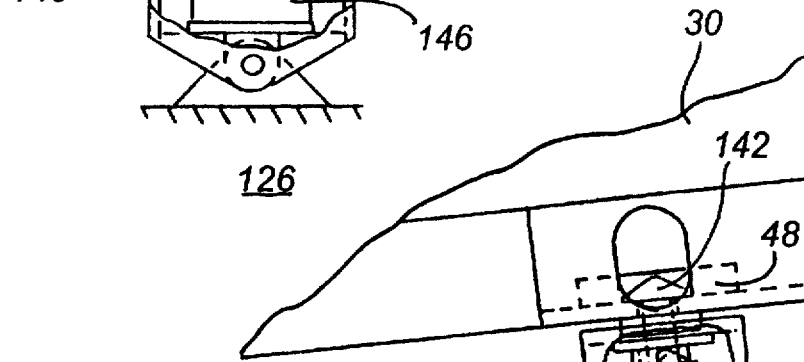
FIG. 21 is an enlarged partially cut-away view of the locking assembly of FIG. 19 showing the locking assembly in the locked position.
Figure 22:
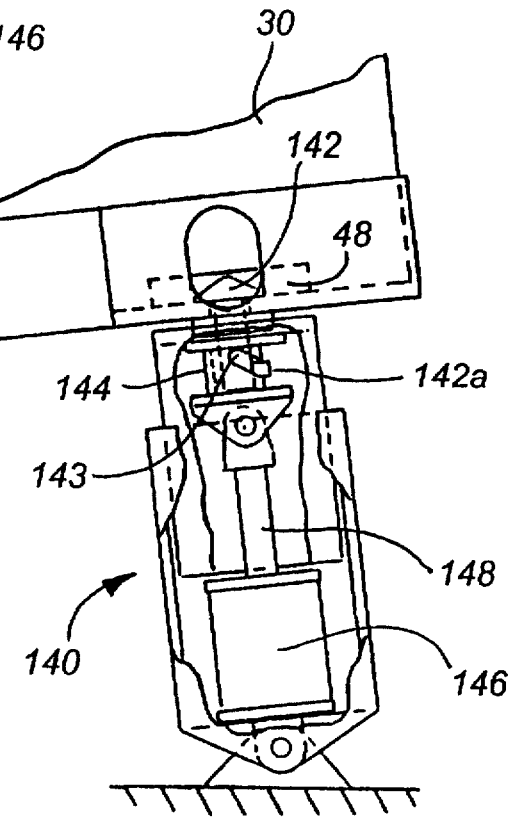
FIG. 22 is an enlarged partially cut-away view of the locking assembly of FIG. 19 showing the locking assembly in the extended or raised position.
Figure 23:
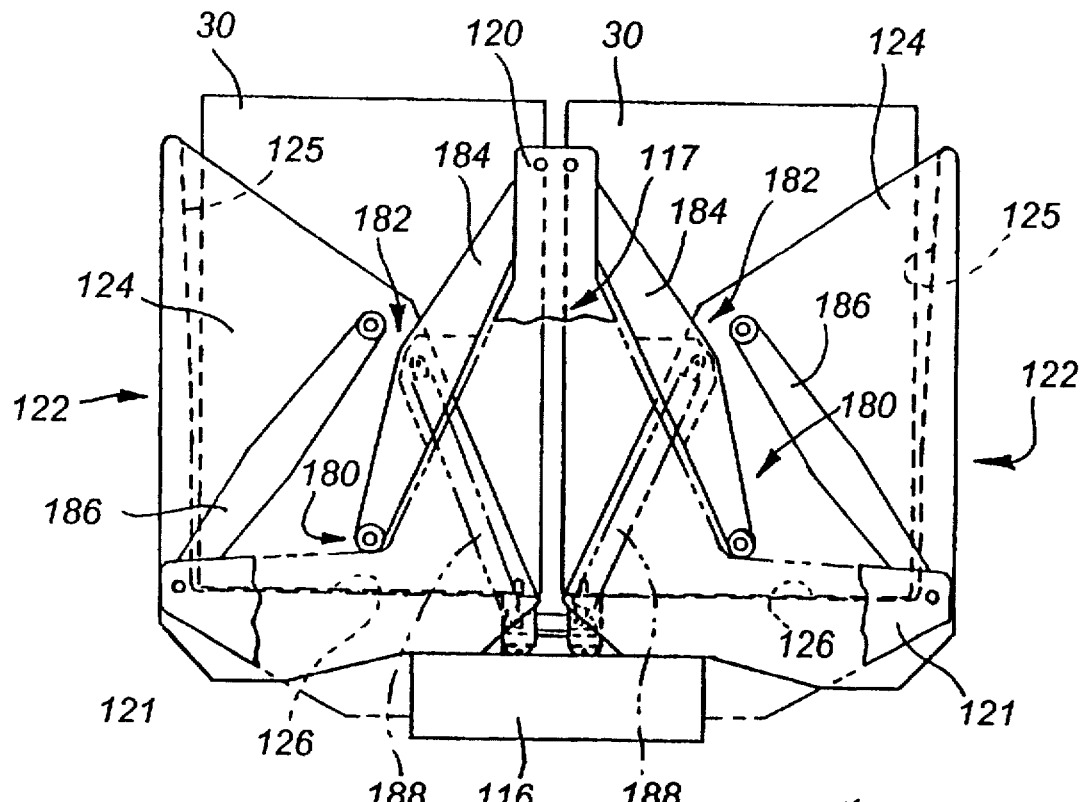
FIG. 23 is a sectional view taken along line 23—23 in FIG. 17 showing the container cradles, the dumping assemblies, and the locking assemblies.

In order to ensure that the shipping containers 30 are securely held in a predetermined position, the container cradles 122 include a plurality of locking assemblies 140. As best shown in FIGS. 20–22, this embodiment of the locking assembly 140 comprises a twist lock end 142 and a hydraulic cylinder 146 having a piston rod 148. As shown in FIG. 22, the locking assembly 140 is pivotally attached to the container cradle floor 126 near the inside edge of the container cradle 122 and has a twist lock end 142 which is slidably attached to the piston rod 148 by a collar 144. Each locking assembly 140 may be moved between an unlocked, a locked, and an extended or raised position. As best shown in FIG. 20, in the unlocked position, the twist lock end 142 extends substantially upward from the cradle floor 126 to engage the corresponding corner casting locking slot 48 formed in the bottom of the shipping container 30. As shown in FIG. 21, in the locked position, the twist lock end 142 engages the locating slot 48, thereby preventing movement or shifting of the shipping container 30 relative to the container cradle 122 during transportation and dumping. In the illustrated embodiment, the twist lock end 142 is actuated by the partial extension of the piston rod 148. The piston rod 148 has a helical slot 143 slidably receiving a pin 142a which is rigidly connected to twist lock end 142. Partial extension of the piston rod 148 causes the pin 142a (and twist lock end 142) to rotate 90° from the disengaged position shown in FIG. 20 to the locked position shown in FIG. 21.

The extended or raised position of the locking assembly 140 is provided in order to support the side walls 33 of the shipping containers 30 during dumping operations. In the extended or raised position shown in FIGS. 22 and 24, the piston rod 148 is fully extended which rotates the shipping container 30 about the axis formed by its lower outside edge. When the piston rod 148 has been fully extended, the outer side of the shipping container 30 abuts against the side wall 125 of the container cradle 122, thereby providing support for the side wall 33 of the shipping container 30.

As with the first embodiment, the second embodiment of the container handler 110 includes a dumping assembly 180 (shown in FIGS. 23–26) which is adapted to dump the shipping containers 30 via their open top. As best shown in FIGS. 23–26, a dumping assembly 180, which rotates the container cradle 122 between centered and dump positions, is provided for each of the container cradles 122. In this embodiment, each dumping assembly 180 essentially consists of a four-bar mechanical linkage 182 (best shown in FIG. 23) comprising the container cradle 122, the support structure 117, and first and second link members 184, 186. As shown in FIG. 18, the illustrated embodiment includes a pair of dumping assemblies 180 disposed at the front and rear ends of each container cradle 122 which act in unison to dump the container cradle 122.

Figure 24:
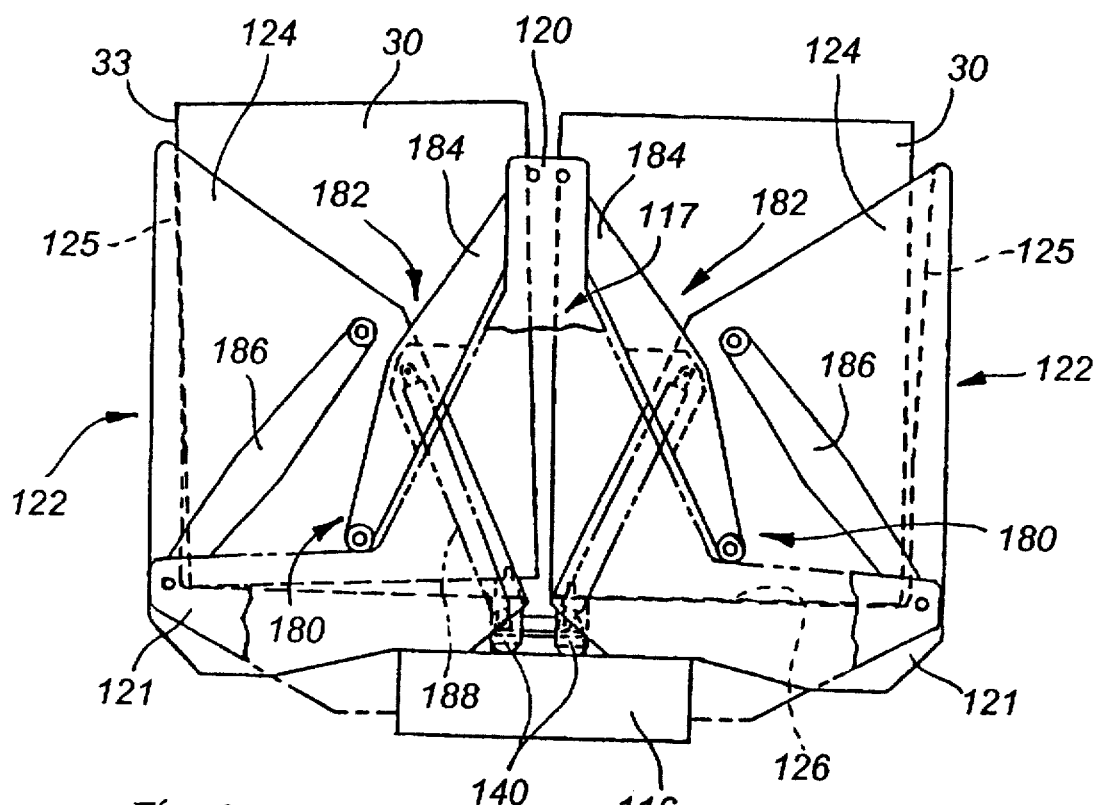
FIG. 24 is a view similar to FIG. 23 showing one locking assembly in the extended or raised position.
Figure 25:
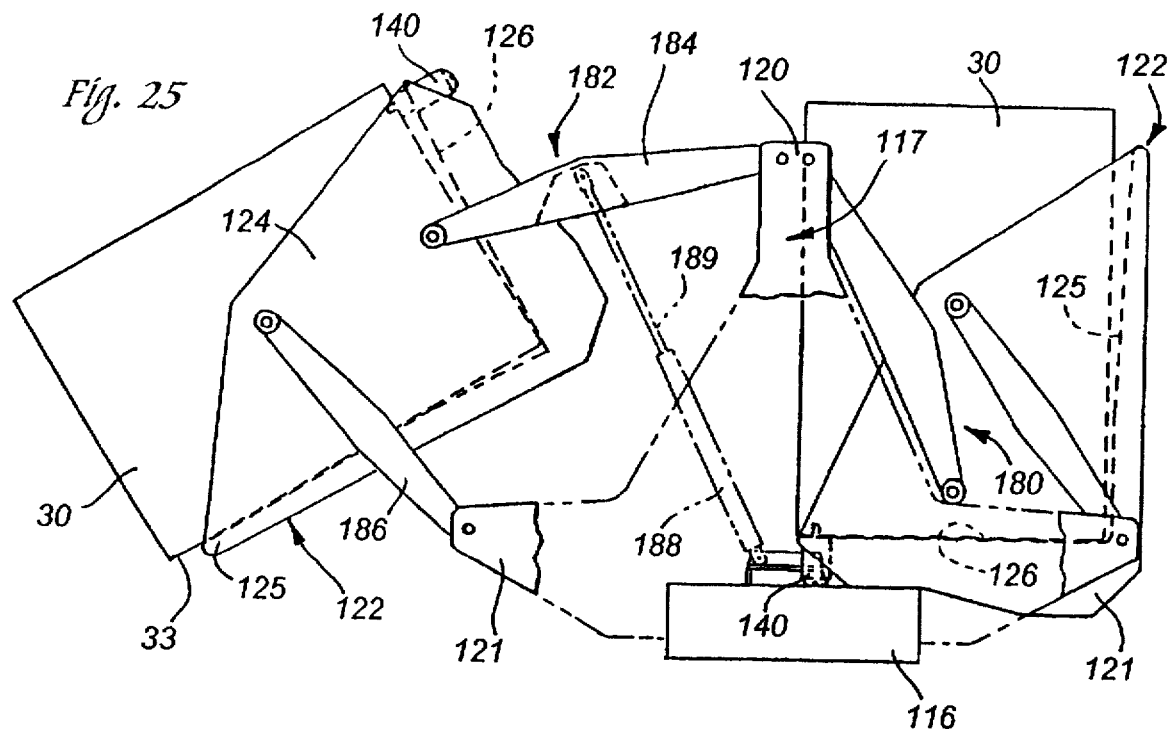
FIG. 25 is a view similar to FIG. 23 showing one dumping assembly moving one container cradle towards the extended or dump position.
Figure 26:
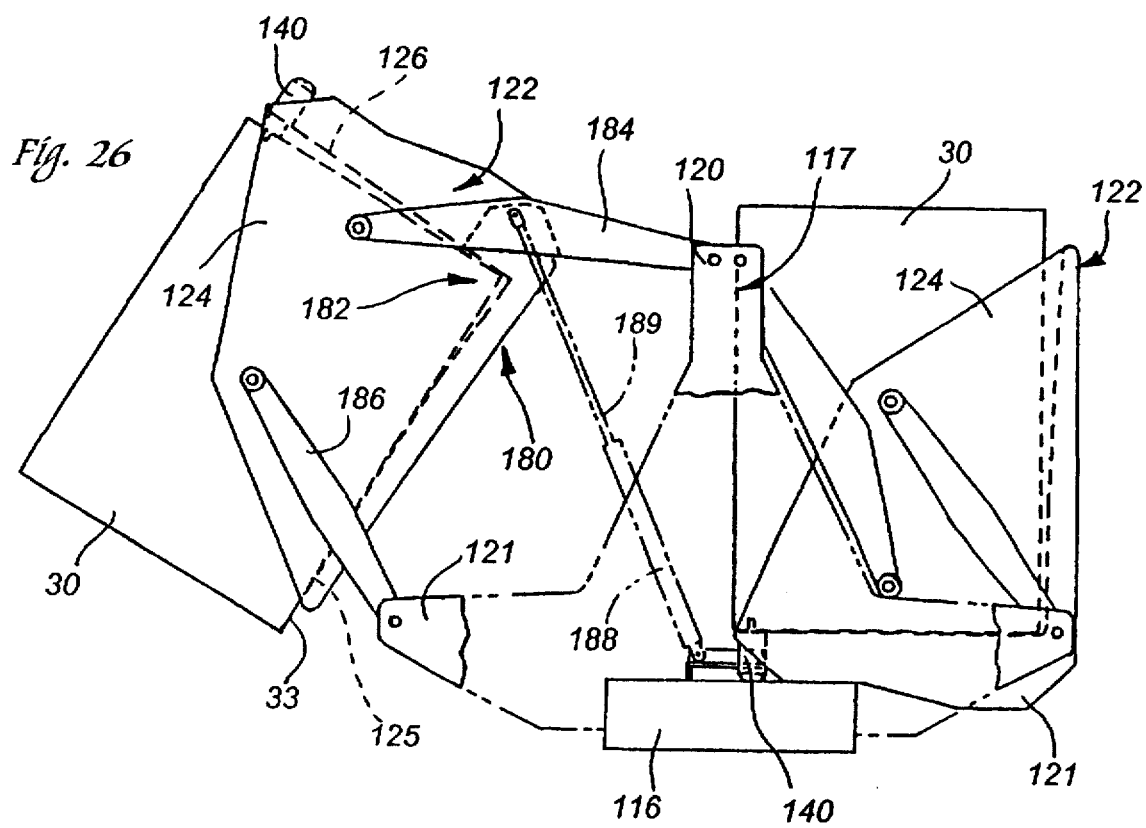
FIG. 26 is a view similar to FIG. 23 showing one container cradle in the dumped position.

As shown in FIGS. 23–26, one end of the first and second link members 184, 186 are pivotally attached to the container cradle 122. The opposite end of the first link member 184 is pivotally attached to the upwardly extending arm 120 and the opposite end of the second link member 186 is attached to one of the outwardly extending members 121 of the support structure 117. Means for actuating the four-bar linkage 182 is provided. In the illustrated embodiment, the actuating means comprises a hydraulic cylinder 188 pivotally attached to the support structure 117 and having a piston rod 189 pivotally attached to link member 184. As shown in FIGS. 25–26, the container cradle 122 is moved into the dump position in response to extension of the piston rod 189. It will be appreciated that other rotating means will be known to those skilled in the art.

As with the first embodiment, the second embodiment of the container handler 110 can be adapted to handle several different load configurations by providing locking assemblies 140 in the appropriate locations in the container cradles 122. With each load configuration, the shipping containers 30 are loaded into the container cradles 122 using an overhead crane or the like. The shipping containers 30 are placed on the appropriate locking assemblies 140 and the operator locks them into place by actuating the twist locks 144. Prior to dumping the shipping containers 30, the operator actuates the locking assemblies 140 into the extended or raised position in order to support the side walls 33 of the shipping containers 30 with the container cradle sides 125 (FIG. 24). The shipping containers 30 are dumped when the operator actuates the hydraulic cylinders 188 of the appropriate dumping assemblies 180 (FIGS. 25–26).

Figure 27:
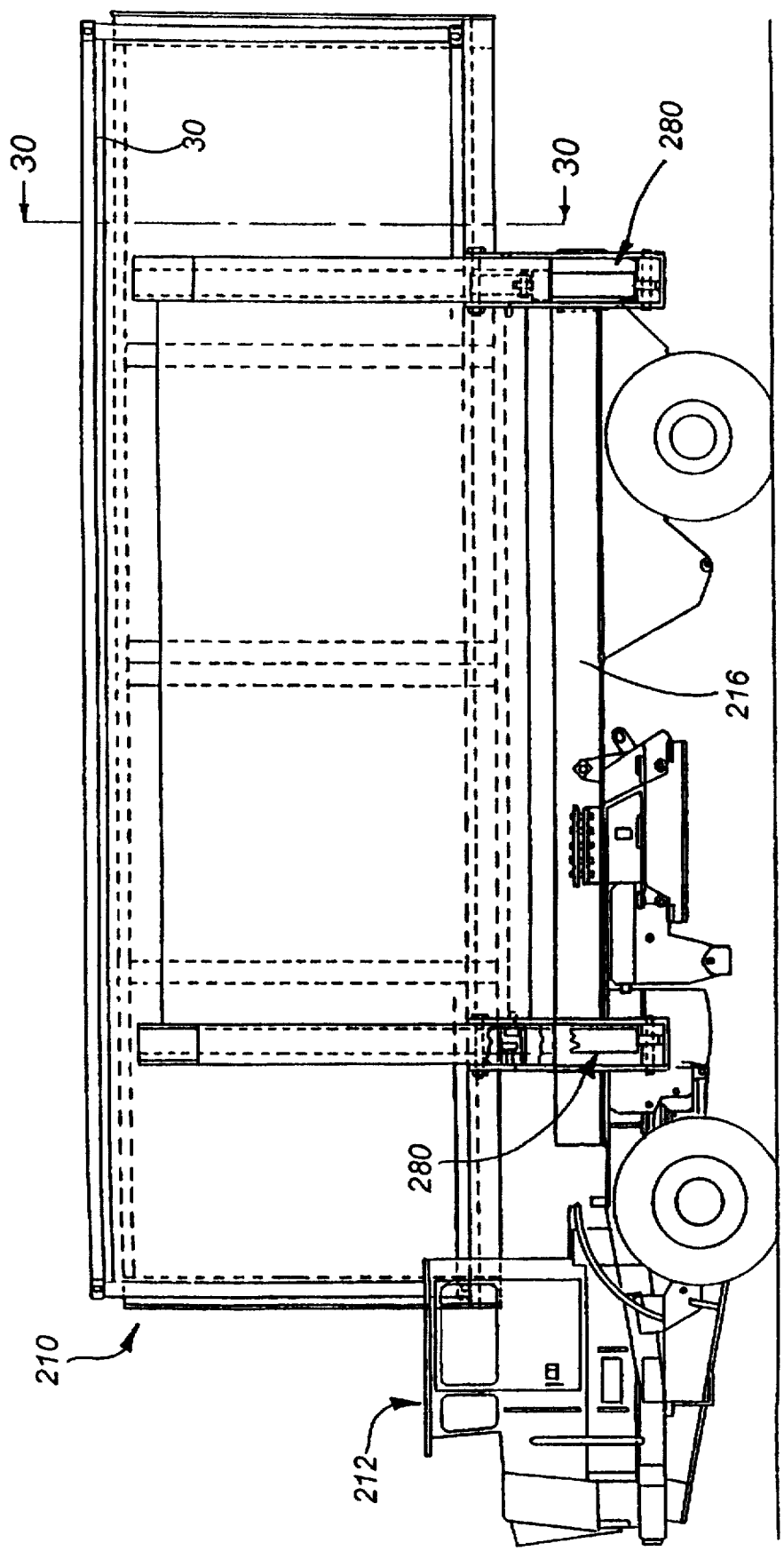
FIG. 27 is a side elevational view of a third embodiment of the top-dumping container handler in accordance with the present invention.
Figure 28:
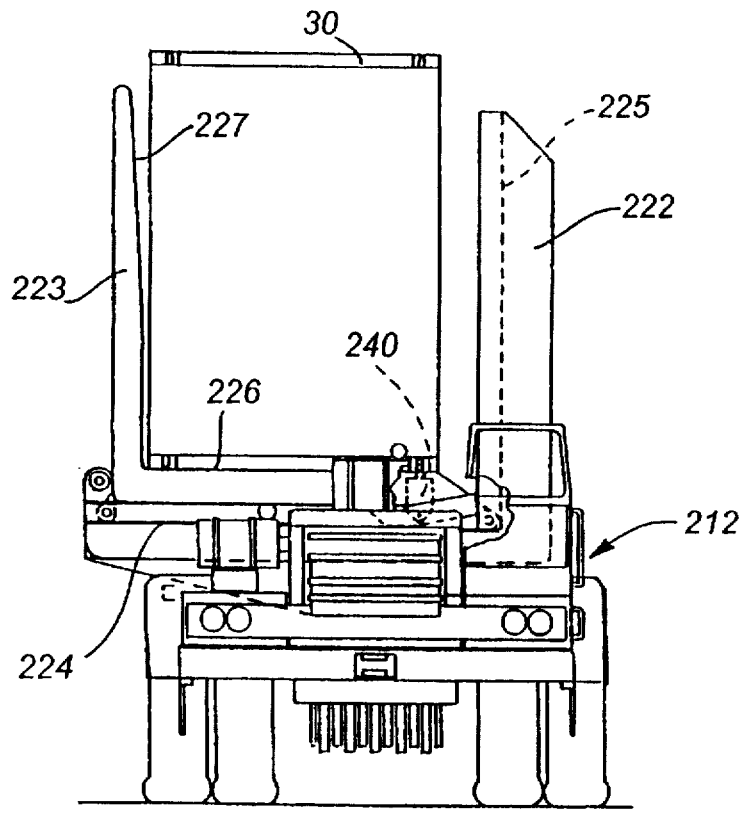
FIG. 28 is a front elevational view of the third embodiment of the top-dumping container handler.
Figure 29:
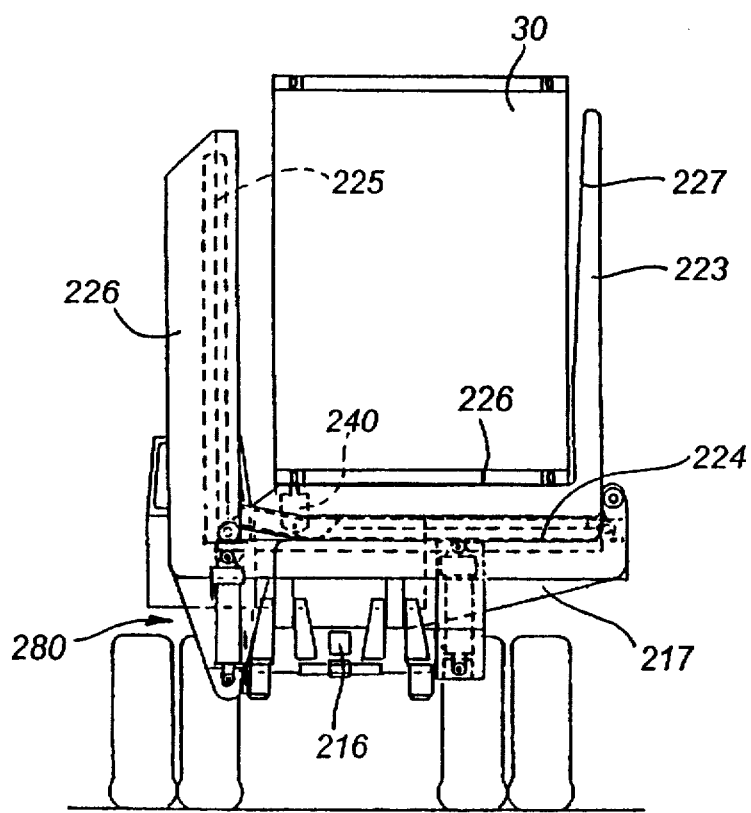
FIG. 29 is a rear elevational view of the third embodiment of the top-dumping container handler.
Figure 30:
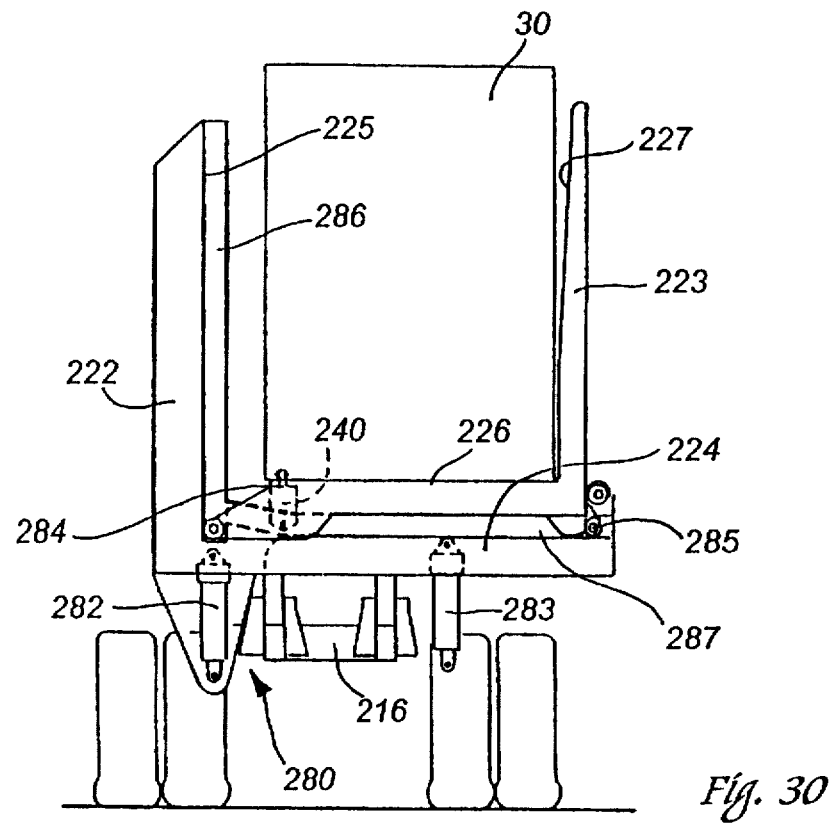
FIG. 30 is a sectional view taken along line 30—30 in FIG. 27 showing the container cradle, the container cradle sub-frame, the locking assembly, and the dumping assembly.

Referring to FIG. 27, there is shown a third embodiment of the top-dumping container handler 210 which includes a truck 212 having a frame 216. As best shown in FIGS. 28–29, a container cradle 222 which supports a container cradle sub-frame 223 is pivotally attached to a support structure 217 that is attached to the frame 216. Both the container cradle 222 and the container cradle sub-frame 223 have an L-shape defined by a floor 224, 226 and a side wall 225, 227. As with the first two embodiments, the container cradle 222 and the container cradle sub-frame 223 are adapted to receive, carry, and dump shipping containers 30.

In order to ensure that the shipping containers 30 are securely held in a predetermined position and to support the side walls 33 of the shipping container 30, the container cradle sub-frame 223 is provided with a plurality of locking assemblies 240. The locking assemblies 240 are similar to those shown in FIGS. 20–22 and discussed above in connection with the second embodiment of the container handler 110.

Figure 31:
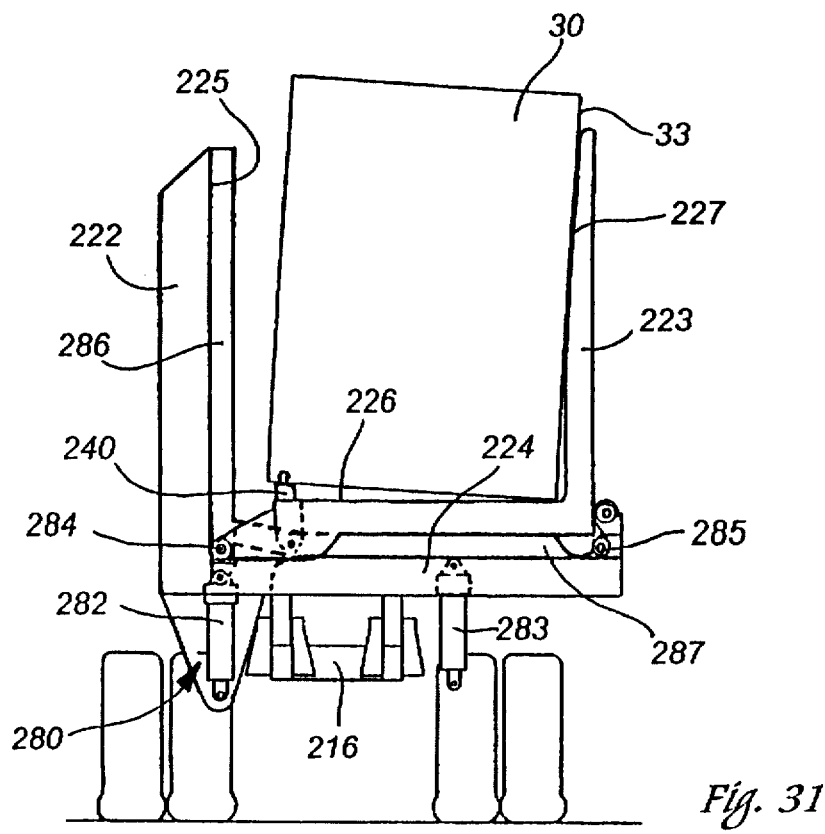
FIG. 31 is a view similar to FIG. 30 showing the locking assembly in the extended or raised position.
Figure 32:
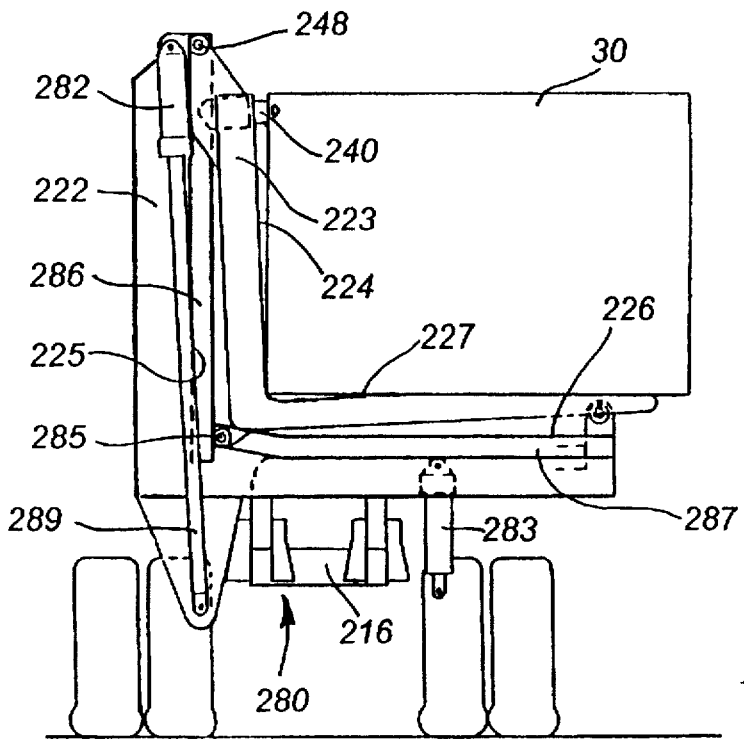
FIG. 32 is a view similar to FIG. 30 showing the container cradle sub-frame in the rotated position.
Figure 33:
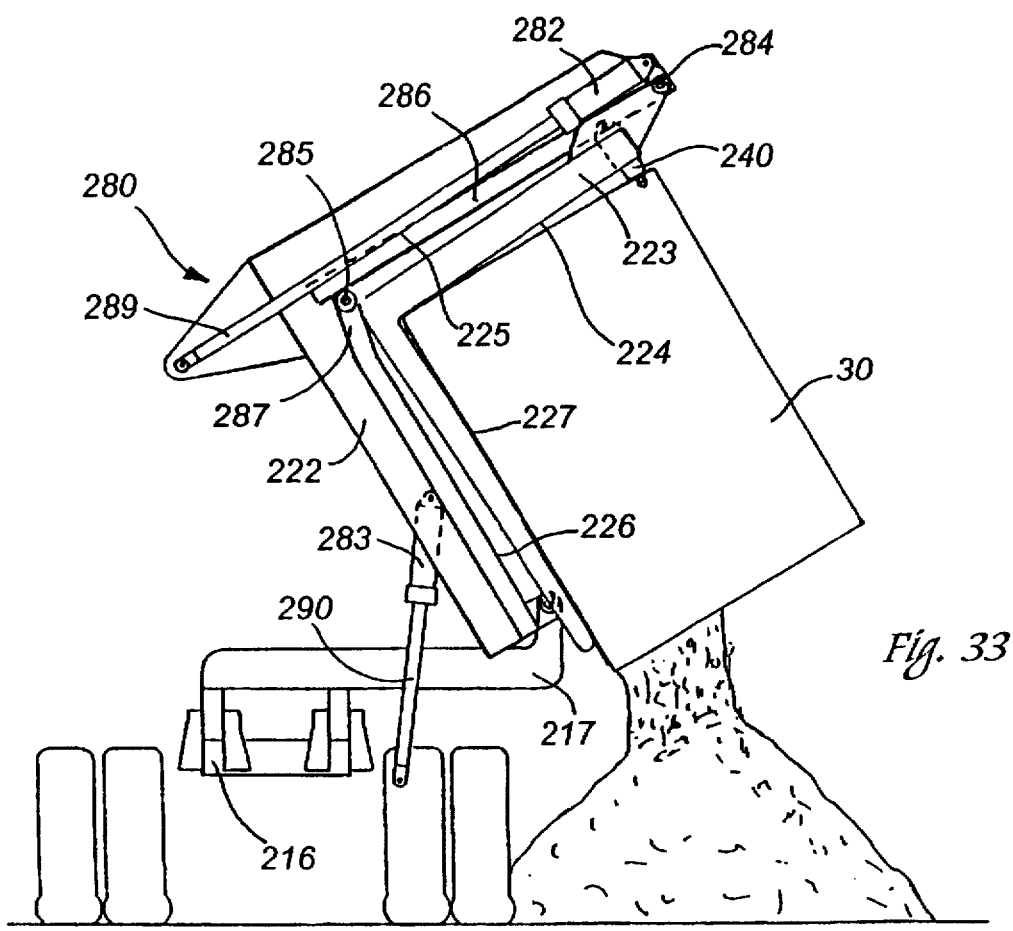
FIG. 33 is a view similar to FIG. 30 showing the container cradle in the dump position.

As with the first and second embodiments, the third embodiment of the container handler 210 is equipped with a dumping assembly 280 which is adapted to dump the shipping containers 30 via their open top. As shown in FIGS. 30–33, the dumping assembly 280 moves the container cradle sub-frame 223 between a centered or upright position and a rotated position, wherein the container cradle sub-frame 223 is rotated approximately 90° from the centered position (FIG. 32). The dumping assembly 280 also moves the container cradle 222 between a retracted or centered position and a dump position (FIG. 33). As shown in FIG. 27, the illustrated embodiment includes a pair of dumping assemblies 280 disposed near the front and rear ends of the truck frame 216 which act in unison to rotate the shipping container 30. As best shown in FIGS. 30–33, each dumping assembly 280 comprises a first and a second hydraulic cylinder 282, 283, a pair of rollers 284, 285 and a pair of guide tracks 286, 287. The guide tracks 286, 287 are disposed on the inside of the side wall 225 and on the floor 224 of the container cradle 222, respectively. The rollers 284, 285 for running in the guide track 286, 287, respectively, are attached near each side of the bottom of the container cradle sub-frame 223. In the illustrated embodiment, the rollers 284, 285 are actuated by a first hydraulic cylinder 282 pivotally attached to the roller 284, attached between 222 and 223, and having a piston rod 289 pivotally attached to the frame 216, 222. As shown in FIG. 32, the container cradle sub-frame 223 moves via the rollers 284, 285 into the rotated position in response to extension of the piston rod 289 of the first hydraulic cylinder 282. The second hydraulic cylinder 283 is pivotally attached to the container cradle 222 and has a telescoping piston rod 290 pivotally attached to the frame 216. As shown in FIG. 33, the container cradle 222 rotates about its pivotal connection to the support structure 217 into the dump position in response to the extension of the piston rod 290.

In a similar fashion to the first and second embodiments, the third embodiment of the container handler 210 can be adapted to handle several different load configurations by providing locking assemblies 240 in the appropriate positions within the container cradle sub-frame 223. The shipping containers 30 are loaded and locked into place in the same manner as described in connection with the second embodiment. Prior to dumping the shipping containers 30, the operator actuates the locking assemblies 240 into the extended or raised position in order to support the side walls 33 of the shipping containers 30 (FIG. 31). When the operator is ready to dump the shipping containers 30, he actuates the first hydraulic cylinder 282 in order to move the container cradle sub-frame 223 into the rotated position (FIG. 32), and then actuates the second cylinder 283, thereby moving the container cradle 222 into the dump position (FIG. 33).

In one embodiment of the invention, the container 30 may have a lid or cover 300 for selectively covering the hauled material. In the embodiment illustrated in FIGS. 34–41, for example, the container 30 has a pair of lids 300 pivotally attached at hinge 302 to the container sides 33 for permitting the lids 300 to pivot between a closed position shown in FIGS. 34–39 and an open position shown in FIGS. 40–41. A lid actuator assembly 304 may also be provided for moving the lid 300 between the closed and open positions.

The illustrated embodiment of the lid actuator assembly 304 comprises a pair of left and right arm assemblies 306 pivotally attached to the rear cradle wall 24 and the front cradle wall 23 (not shown) for selectively engaging the left and right lids 300, respectively. Both the left and right arm assemblies 306 comprise an arm 308 pivotally attached to the cradle 24 by pivot 310 for engaging each of the rear and front portions of the lid 300 but only the rear portion of the arm assemblies 306 and lids 300 are shown in FIGS. 34–41 as the front portion of the arm assemblies 306 operate in an identical manner to the illustrated rear portion of the arm assemblies 306.

Each of the arms 308 are adapted for moving between a rest or retracted position (FIGS. 34–36), an intermediate position (FIGS. 37–39), and an extended or open position (FIGS. 40–41) in response to rotation of the arm actuator 312, the drive shaft 314, chain 316 and pivots 310 and 318. It will be appreciated that the arm actuator 312 is operatively connected to both the front and rear arm by the drive shafts 314.

In order to permit the arms 308 to selectively engage and disengage the lids 300, it will also be seen upon reference to FIGS. 35 and 38 that the arms 308 move from an outboard position in the retracted position (FIG. 35) to an inboard position in the intermediate position (FIG. 38) for engaging pockets 320 in the lids 300. The arm assembly 304 has a diagonally-oriented guide plate 322 associated with each arm 308 for camming the arm 308 from the outboard position in the retracted position (FIG. 35) to the inboard position in the intermediate position (FIG. 38). Thus, it will be appreciated that rotation of the arm assembly 304 causes the arm 308 to cam against the guide plate 322 and move into engagement or disengagement from the lid pocket 320. A spring 324 attached between the arm 304 and the cradle 24 insures that contact is maintained between the arm 304 and guide plate 322.

Figure 36:
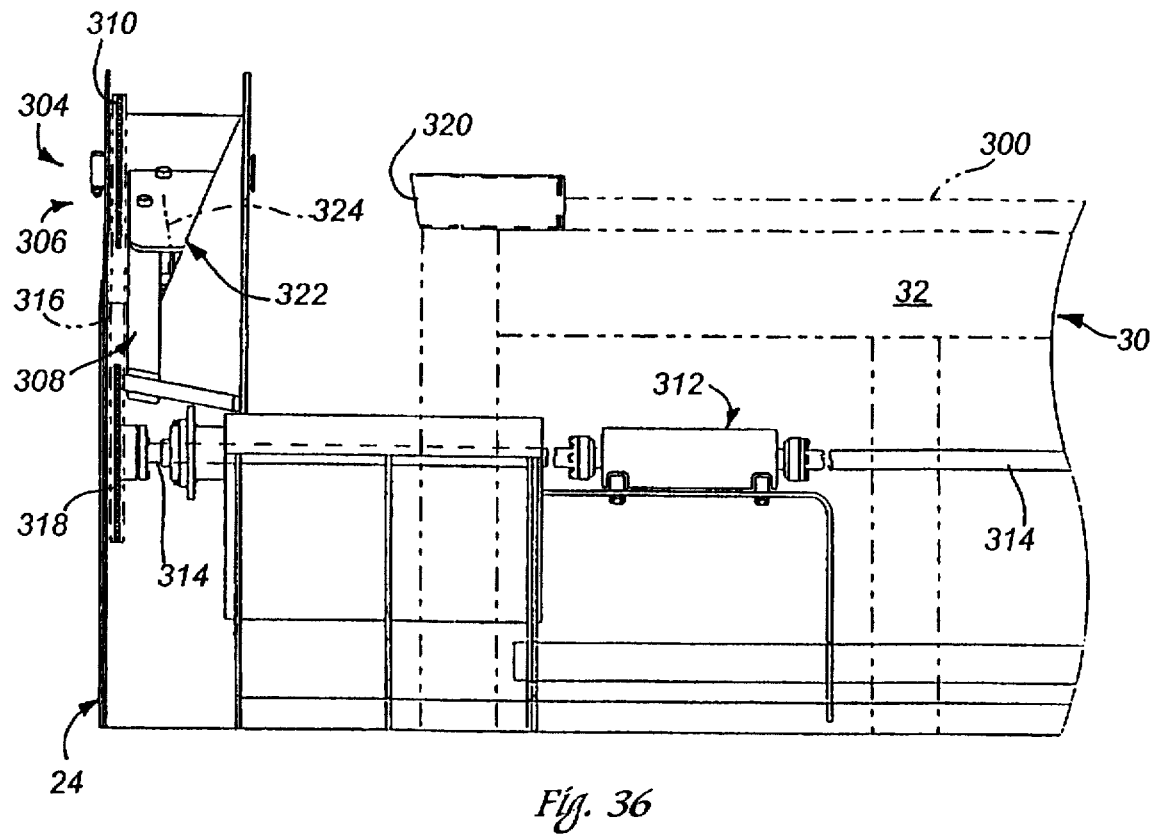
FIG. 36 is a sectional view taken along line 36—36 in FIG. 34 showing the arm in the retracted or rest position and a guide plate for moving the arm into engagement with the cover.

In operation, the container 30 is loaded into the container handler 10, as previously discussed, and the lid 300 is in the closed position. Initially, the arm 304 is disposed in the retracted position as shown in FIGS. 34–36, thereby minimizing any interference with the loading or unloading of the container 30. In order to open the container lid 300, the arm actuator 312 is activated so as to rotate the drive shafts 314 operatively connected to pivot 318, chain 316 and pivot 310 such that the front and rear arms 304 located at the front and rear of the cradle move in unison.

Figure 39:
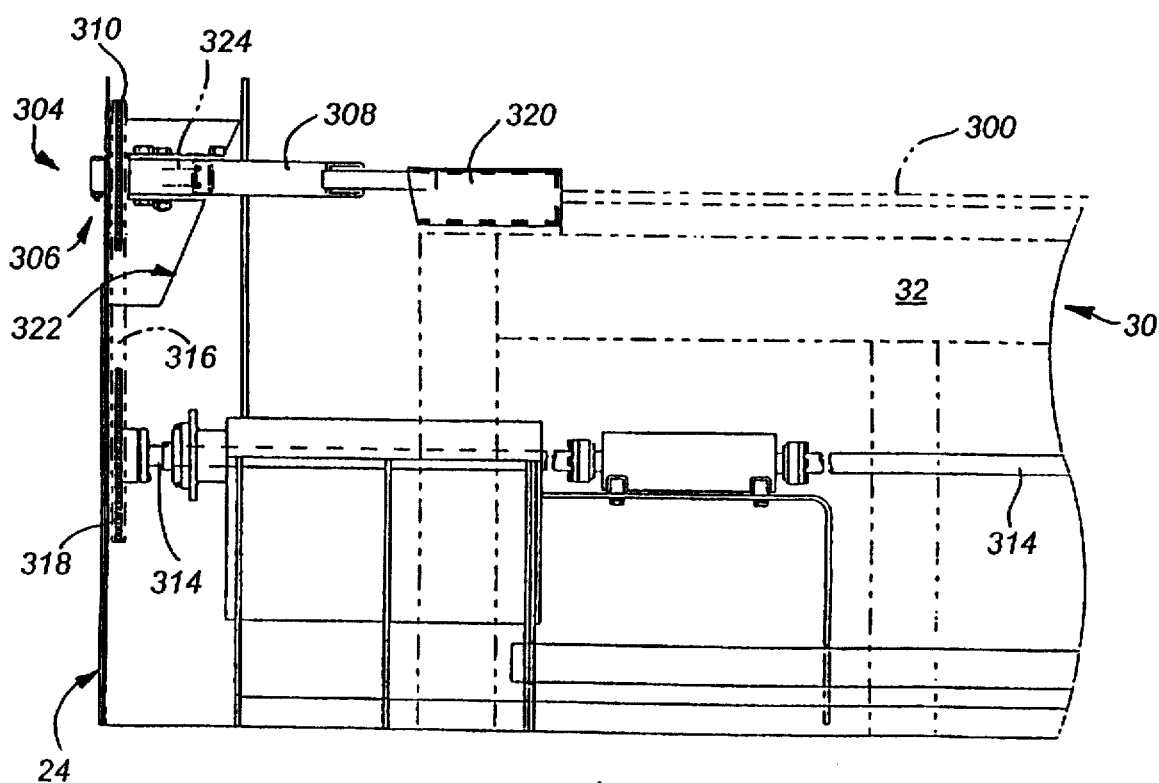
FIG. 39 is a sectional view taken along line 39—39 in FIG. 37 showing the arm in the intermediate position wherein the arm engages the cover pocket in preparation for opening the cover.

It will be appreciated that rotation of the pivot 310 causes the arm 304 to move in two directions. First, the arm 304 moves upwardly from the retracted position best shown in FIG. 34 to the intermediate position best shown in FIG. 37. Second, the arm 304 moves inwardly towards the container 30 from the outboard position best shown in FIGS. 35–36 to the inboard position best shown in FIGS. 38–39 in response to the camming action of the guide plate 322 and the arm 304. The inboard movement of the arm 304 causes the arm 304 to slidably engage the lid pocket 320 as best shown in FIGS. 38 and 39. Once the arm 304 engages the top wall of the lid pocket 320 shown in FIG. 39, the continued rotation of the arm 304 causes the lid 300 to pivot about the hinge 302 to the lid's open position shown in FIGS. 40–41.

In order to close the lid 300, the actuator rotates in the reverse direction, causing the arm 304 to engage the bottom side of the pocket 320 and to move the lid 300 from the open position in FIGS. 40–41 to the lid's closed position shown in FIGS. 37–39. Referring to FIGS. 35–36, for example, it will be seen that the spring 324 maintains contact between the arm 304 and the diagonal surface of the guide plate 322 so that downward movement of the arm 304 causes the arm 304 to move to its outboard position shown in FIGS. 35–36. In this regard, it will also be appreciated that the spring 324 maintains tension on the arm 304, thereby insuring that the arm 304 adequately engages the pocket 320 until the arm 304 is moved to the outboard position.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

We claim as our invention:

1. A top-dumping container handling vehicle for receiving, carrying, and dumping at least one container, wherein each container has at least one locating slot and at least one hooking slot, the container handling vehicle comprising:

a frame having two opposing ends;

a pair of upwardly extending arms each having an upper and a lower end, wherein the lower end of each of the pair of arms is pivotally connected to a respective one of the opposing ends of the trailer frame for rotation between a centered position, a left dump position, and a right dump position;

a container cradle for receiving and holding the container having a front wall, a rear wall, opposing and parallel side walls, and a floor, wherein the front wall and the rear wall are pivotally connected to the upper ends of the pair of arms for rotation between a centered position, a left dump position, and a right dump position;

the container cradle including at least one hooking assembly, wherein each hooking assembly has a pair of hooking pins movable between an unhooked position wherein the pair of hooking pins do not interfere with the loading of the container into the container cradle and a locked position wherein the hooking pin engages a corresponding locating slot formed in the container, thereby preventing movement or shifting of the container relative to the container cradle; and a dumping assembly for simultaneously rotating the arms and the container cradle between the centered position, the left dump position, and the right dump position.

2. The top-dumping container handling vehicle according to claim 1 wherein the container cradle comprises at least one locating pin assembly, wherein each locating pin assembly includes a pair of locating pins movable between a retracted or disengaged position wherein the locating pins do not interfere with the loading of the container into the container cradle and an extended or engaged position wherein the locating pin engages a the corresponding locating slot on the container, thereby ensuring that the container is loaded into the proper position within the container cradle.

3. The top-dumping container handling vehicle according to claim 2 wherein the container cradle comprises at least one width control assembly for facilitating the engagement of the locating pins with the corresponding locating slots.

4. The top-dumping container handling vehicle according to claim 1 wherein the container cradle comprises at least one wall support assembly movable between a retracted or disengaged position wherein the wall support assembly does not interfere with the loading of the container into the container cradle and an extended or engaged position wherein the wall support assembly bears against the wall of the container, thereby supporting the wall.

5. The top-dumping container handling vehicle according to claim 1 wherein the dumping assembly comprises a gear mounted on the container cradle, a complementary gear mounted on the frame, one of said pair of upwardly extending arms, and a pair of hydraulic cylinders having piston rods wherein the piston rods are pivotally attached to one of the pair of upwardly extending arms and the cylinders are pivotally attached to the frame.

6. The top-dumping container handling vehicle according to claim 1 comprising outriggers attached to the frame movable between a disengaged position wherein the outriggers are disposed close to the frame so as not to interfere with movement of the container handling vehicle and an engaged position wherein the outriggers contact the ground, thereby stabilizing the container handling vehicle.

7. The top-dumping container handling vehicle according to claim 1 wherein coacting dumping assemblies are disposed on each end of the container cradle.

8. The top-dumping container handling vehicle according to claim 1 wherein the dumping assembly is adapted such that the left dumping position and the right dumping position are not equidistant from a center of the container handler.

9. A top-dumping container handling vehicle for receiving, carrying, and dumping at least one container wherein each container has at least one locking slot, the container handling vehicle comprising:

a frame having two opposing ends;

a support structure attached near both ends of the frame including an upwardly extending arm and a pair of opposing outwardly extending members;

a pair of container cradles arranged side-by-side for receiving and holding the container wherein the container cradles are supported by the support structure for movement between a centered position and a dump position and have a substantially L-shaped body defined by a front wall, a rear wall, a side wall and a floor;

each container cradle including at least one locking assembly movable between an unlocked position wherein the locking assembly does not interfere with the loading of the container into the container cradle and a locked position wherein the locking assembly engages the corresponding locking slot on the container, thereby preventing movement or shifting of the container relative to the container cradle; and a dumping assembly for each container cradle which moves the container cradle between the centered position and the dump position.

10. The top-dumping container handling vehicle according to claim 9 wherein the locking assembly has an extended or raised position wherein the locking assembly rotates the container into supporting engagement with the side wall of the container cradle.

11. The top-dumping container handling vehicle according to claim 9 wherein each dumping assembly comprises a four-bar mechanical linkage.

12. The top-dumping container handling vehicle according to claim 9 wherein the locking assembly includes a twist lock end engageable with the corresponding locking slot on the container, thereby locking the container into the container cradle, a hydraulic cylinder for actuating the twist lock, and a collar for slidably attaching the twist lock end to the hydraulic cylinder.

13. The top-dumping container handling vehicle according to claim 9 wherein a pair of coacting dumping assemblies are disposed at either end of each container cradle.

14. A top-dumping container handling vehicle for receiving, carrying, and dumping at least one container wherein each container has at least one locking slot, the container handling vehicle comprising:

a frame having two opposing ends;

a support structure attached near both ends of the frame;

a container cradle pivotally attached to the support structure for movement between a retracted or centered position and a dump position wherein the container cradle has an L-shape defined by a side wall and a floor;

a container cradle sub-frame supported by the container cradle for movement between a centered or upright position and rotated position wherein the container cradle sub-frame has an L-shape defined by a side wall and a floor;

the container cradle sub-frame including at least one locking assembly movable between an unlocked position wherein the locking assembly does not interfere with the loading of the container into the container cradle and a locked position wherein the locking assembly engages the corresponding locking slot on the container, thereby preventing movement or shifting of the container relative to the container cradle sub-frame; and a dumping assembly for moving the container cradle sub-frame between the centered or upright position and the rotated position and for moving the container cradle between the retracted or centered position and the dumping position.

15. The top-dumping container handling vehicle according to claim 14 wherein the locking assembly has an extended or raised position wherein the locking assembly rotates the container into supporting engagement with the side wall of the container cradle sub-frame.

16. The top-dumping container handler according to claim 14 wherein the dumping assembly comprises a first guide track disposed on the side wall of the container cradle, a second guide track disposed on the floor of the cradle, a first roller attached to the bottom of the floor of the container cradle sub-frame for running in the first guide track, a second roller attached to the bottom of the floor of the container cradle sub-frame for running in the second guide track, a first hydraulic cylinder for actuating the rollers in the guide tracks, and a second hydraulic cylinder attached to the container cradle and the support structure.

17. The top-dumping container handling vehicle according to claim 14 wherein the locking assembly includes a twist lock end engageable with the corresponding locking slot on the container, thereby locking the container into the container cradle sub-frame, a hydraulic cylinder for actuating the twist lock, and a collar for slidably attaching the twist lock end to the hydraulic cylinder.

18. The top-dumping container handling vehicle according to claim 14 wherein coacting dumping assemblies are disposed at either end of the container cradle.

19. A top-dumping container handler for receiving and dumping at least one container, wherein each container has at least one locating slot and at least one hooking slot, the container handler comprising:

a frame having two opposing ends;

a pair of upwardly extending arms each having an upper and a lower end, wherein the lower end of each of the pair of arms is pivotally connected to a respective one of the opposing ends of the frame for rotation between a centered position, a left dump position, and a right dump position;

a container cradle for receiving and holding the container having a front wall, a rear wall, opposing and parallel side walls, and a floor, wherein the front wall and the rear wall are pivotally connected to the upper ends of the pair of arms for rotation between a centered position, a left dump position, and a right dump position;

the container cradle including at least one hooking assembly, wherein each hooking assembly has a pair of hooking pins movable between an unhooked position wherein the hooking pins do not interfere with the loading of the container into the container cradle and a locked position wherein the hooking pins engage a corresponding locating slot formed in the container, thereby preventing movement or shifting of the container relative to the container cradle; and a dumping assembly for simultaneously rotating the arms and the container cradle between the centered position, the left dump position, and the right dump position.

20. The top-dumping container handler according to claim 19 wherein the container cradle comprises at least one locating pin assembly, wherein the locating pin assembly includes a pair of locating pins movable between a retracted or disengaged position wherein the locating pins do not interfere with the loading of the container into the container cradle and an extended or engaged position wherein the locating pins engage a corresponding locating slot on the container, thereby ensuring that the container is loaded into the proper position within the container cradle.

21. The top-dumping container handler according to claim 19 wherein the container cradle comprises at least one width control assembly for facilitating the engagement of the locating pins with the corresponding locating slots.

22. A top dumping container handler for receiving and dumping at least one container wherein each container has at least one lid movable between a closed position for covering the interior of the container and an open position for permitting access to the interior of the container, the handler comprising:

a cradle for supporting the container;

an arm assembly spaced from the lid and pivotally attached to the cradle for moving the lid between the closed and open positions wherein the arm assembly comprises an arm for selectively engaging the lid in response to an actuator operatively attached to the arm for moving the arm wherein the arm is attached to the cradle for moving between a rest position in which the arm does not engage the lid, an intermediate position in which the arm engages the lid in the closed position, and an extended position in which the arm engages the lid in the open position in response to the actuator.

23. The handler according to claim 22 wherein the cradle comprises a guide surface for moving the arm between the rest position and the intermediate position in response to the actuator.

24. The handler according to claim 22 wherein the lid has opposing ends and the arm assembly has opposing arms for engaging each end.

* * * * *